United States Patent
Fujiwara et al.

(10) Patent No.: US 6,804,022 B2
(45) Date of Patent: Oct. 12, 2004

(54) PRINTER, DATA PROCESSING APPARATUS, DATA TRANSMITTING APPARATUS, PRINT CONTROL APPARATUS, PRINTING SYSTEM, RECORDING MEDIUM, AND PRINT CONTROL METHOD

(75) Inventors: Takaji Fujiwara, Kato (JP); Hiroyo Teramoto, Kato (JP); Nobuko Fujiwara, Ono (JP); Noriko Nagano, Kato (JP); Koichi Sekine, Kato (JP)

(73) Assignee: Fuji Xerox Co., Ltd., Tokyo (JP)

( * ) Notice: Subject to any disclaimer, the term of this patent is extended or adjusted under 35 U.S.C. 154(b) by 158 days.

(21) Appl. No.: 09/818,548

(22) Filed: Mar. 28, 2001

(65) Prior Publication Data

US 2001/0013948 A1 Aug. 16, 2001

Related U.S. Application Data

(63) Continuation of application No. PCT/JP99/04555, filed on Aug. 23, 1999.

(30) Foreign Application Priority Data

Sep. 29, 1998 (JP) .......................................... 10-276237

(51) Int. Cl.[7] .............................................. G06F 15/00
(52) U.S. Cl. ..................... 358/1.15; 358/1.16; 358/1.17
(58) Field of Search .............................. 358/1.13, 1.14, 358/1.15, 1.16, 1.17, 1.9; 399/8, 9

(56) References Cited

U.S. PATENT DOCUMENTS 5,165,014 A * 11/1992 Vassar ........................ 358/1.13
5,550,957 A    8/1996 Davidson, Jr. et al. ..... 395/114
5,596,416 A *  1/1997 Barry et al. ................. 358/296
5,859,711 A *  1/1999 Barry et al. ............... 358/1.15
6,075,615 A    6/2000 Nakamura ................. 358/1.14
6,246,486 B1 * 6/2001 Takahashi ................. 358/1.13

FOREIGN PATENT DOCUMENTS

| JP | 3-29019     | 2/1991  |
| JP | 03029019    | 7/1991  |
| JP | 09-238932   | 10/1997 |
| JP | 9-258931    | 10/1997 |
| JP | 09-258932   | 10/1997 |

* cited by examiner

*Primary Examiner*—Twyler Lamb
(74) *Attorney, Agent, or Firm*—Staas & Halsey LLP

(57) ABSTRACT

In a print control method, a print request is made designating a physical or logical printer which is to perform printing, and when the designated physical or logical printer is printing, the print request is automatically switched to a physical or logical printer other than the designated printer. A system includes a printer, a data processing apparatus, a data transmitting apparatus and a print control apparatus for implementing the print control method, a printing system using these apparatuses, and a recording medium which stores a program for causing a computer to execute such print control. For printing, a table showing whether physical or logical printers which can accept a print request are operating or not, is referred to in order to judge operating statuses of the printer, and a print request is made automatically selecting a physical or logical printer which is "unoccupied." At this stage, if the selected physical or logical printer has a different protocol from an initially intended printer, the protocol is converted automatically.

19 Claims, 26 Drawing Sheets

FIG. 4

| PRINTING SPECIFICATION INFORMATION AREA |
|---|
| PRINTING SPECIFICATION INFORMATION |
| PRINTING SPECIFICATION INFORMATION |
| PRINTING SPECIFICATION INFORMATION |
| PRINTING SPECIFICATION INFORMATION |
| PRINTING SPECIFICATION INFORMATION |
| PRINTING SPECIFICATION INFORMATION |
| PRINTING SPECIFICATION INFORMATION |
| PRINTING SPECIFICATION INFORMATION |

| |
|---|
| REQUESTING SOURCE CLIENT |
| NEXT PRINT SPECIFICATION INFORMATION |
| PAGE COUNT |
| SINGLE SIDE/DOUBLE SIDE PRINT INFORMATION |
| PAPER SIZE INFORMATION |
| DESIGNATED PAPER FEED HOPPER |
| DESIGNATED DISCHARGE STACKER |
| CONTENTS OF PRINT DATA |

FIG. 8

| REQUEST SOURCE CLIENT | JOB NUMBER | PRINTER DEVICE NAME | LOGICAL PRINTER NUMBER | DISCHARGE STACKER TYPE | DISCHARGE STACKER NUMBER |
|---|---|---|---|---|---|

PRINTER, DATA PROCESSING APPARATUS, DATA TRANSMITTING APPARATUS, PRINT CONTROL APPARATUS, PRINTING SYSTEM, RECORDING MEDIUM, AND PRINT CONTROL METHOD

This application is a continuing application, filed under 35 U.S.C. §111(a), of International Application PCT/JP99/04555, filed Aug. 23, 1999, it being further noted that priority is based upon Japanese Patent Application 10-276237, filed Sep. 29, 1998.

TECHNICAL FIELD

The present invention relates to a print control method according to which a data transmitting apparatus transmits print data and any one of a plurality of printing means prints out the transmitted print data, a printer, a data processing apparatus, a data transmitting apparatus and a print control apparatus which implement the method, a printing system which uses these apparatuses, and a recording medium in which a program for realizing the above is recorded.

BACKGROUND ART

Currently in a popular use is a system in which a plurality of clients and one server are connected to a network such as a LAN so as to share one printer. In such a system, since other print requests can not be accepted during processing of one print request transmitted to a printer from a client through the server, a print request must be made once again after the processing completes. Since this requires the server which temporarily holds print requests from the clients to monitor a processing status of the printer, there is a problem that a load upon the server increases.

In order to solve the problem, the applicant of the present patent application has proposed the following method in Japanese Patent Application Laid-Open No. 8-36472 (1996). That is, logical printers which are a plurality of virtual printers that are operable independently of each other are set within one printer which physically exists, so that it is possible to process print requests from a plurality of clients in parallel, and therefore, one printer can be used as a plurality of printers. It is possible to accept a plurality of print requests at the same time as the print requests are managed as print queue, which not only reduces a load upon the server but also enhances a throughput of a system as a whole. The applicant of the present patent application refers to such a printer that a plurality of virtual printers are set in an actual printer, as a "virtual system printer".

However, with conventional methods, when a designated logical printer is in the process of printing, it is necessary to queue to the end of print queue for the designated logical printer so as to wait for printing, or it is necessary to judge operating statuses of logical printers which can accept a print request, select an unoccupied logical printer and make a print request once again to the selected logical printer. Hence, there is a problem that a waiting time is uneconomical if printing is to be waited, and that manually executing complicated processing is troublesome if a print request needs be made once again.

Particularly when a re-designated logical printer has a different (communication) protocol from an initially designated logical printer, it is necessary not only to designate the logical printer once again but to convert the protocol as well, which is a problem that the conversion takes a further time than where the protocols are the same.

In addition, since print requests are received from the plurality of clients, during printing for a print request from one client which takes time, even if other clients issue print requests, those print requests must wait a long time until actual printing takes place. This therefore is a problem that there is an uneconomical waiting time even when a print request is directed to an available logical printer and a total throughput accordingly decreases.

Further, since connection lines connecting LAN lines and printers have a slower data transmission rate than LAN lines, the connection lines serve as an obstacle against a data transmission rate for data which are transmitted from the server to the printers through the LAN lines and the connection lines. Hence, there is a problem that when print requests build up, slow data transmission occupies the LAN lines which are faster and an overall throughput accordingly drops. In this case, the overall throughput decreases when a particular printer is crowded with printing even despite a buffer apparatus which is disposed between the LAN lines and the printers and temporarily stores print requests. Still further, a similar problem arises also when a data transmission volume from the server to the printers exceeds a processing speed of the printers to receive data.

The present invention has been made to solve the problems as described above. Accordingly, one object of the present invention is to provide a print control method with which it is possible to make a print request for print data created by a data transmitting apparatus, designating a logical printer (virtual printer) which is to execute printing, and when the designated logical printer is in the process of printing, automatically switch the print request to other logical printer than the designated logical printer so that an uneconomical time to wait for printing is reduced and a job of making a print request again is omitted, to provide a printer, a data processing apparatus, a data transmitting apparatus and a print control apparatus which implement the method, to provide a printing system which uses these apparatuses, and to provide a recording medium in which a program for performing print control is recorded.

Other object of the present invention is to provide a print control method with which it is possible to automatically perform protocol conversion if a logical printer which was switched over to has a different protocol from an initially designated logical printer, so as to omit protocol conversion.

Another object of the present invention is to provide a print control apparatus which temporality stores print requests, selects a printer which can efficiently execute printing, and makes a print request to the printer without using through a LAN line, so as to prevent an overall throughput from decreasing.

Still further, the present invention aims at providing a print control method with which it is possible to automatically change a print request directed to a certain logical printer of a printer into a print request directed to other printer, so as to shorten a print waiting time and therefore prevent an overall throughput from decreasing.

DISCLOSURE OF THE INVENTION

A printer according to a first invention is a printer comprising a plurality of virtual printing means, which share a physical portion and operate independently of each other for parallelly processing a plurality pieces of print data supplied from outside, and processing print data by printing means corresponding to communication setting which is used when the print data is supplied, characterized by comprising: judging means for judging whether printing means corresponding to communication setting of supplied print data is operating or not; and controlling means for, when the judging means judges that the printing means is operating, controlling any one of remaining printing means which is not operating to process the print data.

According to the first invention, the control is that whether a plurality of virtual printers (logical printers) provided in a physical printer are operating or not is judged in addition to judging the physical printer, and when a printer designated by print data transmitted from outside is operating (printing), a print request, for example, is automatically switched to other printer than the designated printer, whereby a printer which is not operating performs printing. Hence, it is possible to reduce an uneconomical time waiting for printing and omit, for an operator, a job of requesting for printing once again.

A data processing apparatus according to a third invention is a data processing apparatus for transmitting print data supplied from outside to physical printing means or any one of a plurality of virtual printing means set in physical printing means which share a physical portion and operate independently of each other for parallelly processing a plurality pieces of print data, characterized by comprising: a table which shows whether the printing means are operating or not; means for judging whether the printing means are operating or not based on the table; and means for, when it is judged that printing means designated as a first transmission destination is operating, selecting other printing means which is not operating as a second transmission destination.

Apparatus according to the third invention, the table which shows whether respective printers, such as a physical printer and virtual printers, are operating or not is provided, and judgement whether a designated printer is operating or not referring to the table is executed. When the designated printer is operating (printing), a print request, for example, is automatically switched to other printer than the designated printer, so that a printer which is not operating performs printing. Hence, it is possible to reduce an uneconomical time waiting for printing and omit, for an operator, a job of requesting for printing once again.

A data transmitting apparatus according to a fifth invention is a data transmitting apparatus for transmitting print data to physical printing means or any one of a plurality of virtual printing means set in physical printing means which share a physical portion and operate independently of each other for parallelly processing a plurality pieces of print data, characterized by comprising: a table which shows whether the printing means are operating or not; means for judging whether the printing means are operating or not based on the table; means for, when it is judged that printing means designated as a first transmission destination is operating, deleting the print data transmitted to the first transmission destination; and means for transmitting the print data to other printing means which is not operating as a second transmission destination.

A recording medium apparatus according to a fifteenth invention is a computer readable recording medium storing a program for causing a computer to transmit print data to physical printing means or a plurality of viral printing means set in physical printing means which share a physical portion and operate independently of each other for parallelly processing a plurality pieces of print data, characterized by comprising: first program code means for causing a computer to transmit print data by communication settings set separately for respective printing means, so that any one of the printing means performs printing; second program code means for causing a computer to set up a table which shows whether the printing means are operating or not and/or information relating to print processing capabilities of the printing means; third program code means for causing the computer to judge, based on the table set up by the computer, whether the printing means are available for printing; fourth program code means for causing the computer, when it is judged that printing means designated as a first transmission destination is not available for printing, to delete the print data transmitted to the first transmission destination; and fifth program code means for causing the computer to transmit the print data to other printing means which is available for printing as a second transmission destination.

According to the fifth and the fifteenth inventions, the data transmitting apparatus or a computer comprises a table which shows whether respective printers, such as a physical printer and virtual printers, are operating or not, and whether a designated printer is operating is judged referring to the table. When the designated printer is operating (printing), after deleting print data which were already transmitted to the designated printer, a print request, for example, is automatically switched to other printer than the designated printer, thereby controlling such that a printer which is not operating performs printing. Hence, it is possible to automate the processing, in accordance with the switching, of deleting the print data which were transmitted at the beginning, to reduce an uneconomical time waiting for printing and omit, for an operator, a job of requesting for printing once again.

A printer according to a second invention is characterized in that, in the first invention, the control means comprises: means for judging communication setting of the supplied print data; and means for, when it is judged that the communication setting does not correspond to printing means for processing the print data, converting the communication setting into communication setting corresponding to the printing means.

A data processing apparatus according to a fourth invention is characterized in that, in the third invention, further comprising: means for judging communication settings used for transmitting print data to printing means of the first and second transmission destinations; and means for, when it is judged that communication settings corresponding to printing means as the first and second transmission destinations are different from each other, converting communication setting corresponding to the first transmission destination into communication setting corresponding to the second transmission destination.

A data transmitting apparatus according to a sixth invention is characterized in that, in the fifth invention, further comprising: means for judging communication settings used for transmitting print data to printing means of the first and second transmission destinations; and means for, when it is judged that communication settings corresponding to the first and second transmission destinations are different from each other, converting communication setting corresponding to the first transmission destination into communication setting corresponding to the second transmission destination.

A print control apparatus according to an eighth invention is characterized in that, in the seventh invention, further comprising: means for judging communication settings used for transmitting print data to printing means of the first and second transmission destinations; and means for, when it is judged that communication settings corresponding to the first and second transmission destinations are different from each other, converting communication setting corresponding to the first transmission destination into communication setting corresponding to the second transmission destination.

A recording medium according to a fourteenth invention is characterized in that, in a thirteenth invention, the third program code means comprises: program code means for causing the computer to judge communication settings used for transmitting print data to printing means of the first and the second transmission destinations; and program code means for causing the computer, when it is judged that the communication settings corresponding to the first and the second transmission destinations are different from each other, to convert communication setting corresponding to the first transmission destination into communication setting corresponding to the second transmission destination.

A recording medium according to a sixteenth invention is characterized in that, in the fifteenth invention, the fifth program code means comprises: program code means for causing the computer to judge communication settings used for transmitting print data to printing means of the first and the second transmission destinations; and program code means for causing the computer, when it is judged that the communication settings corresponding to the first and the second transmission destinations are different from each other, to convert communication setting corresponding to the first transmission destination into communication setting corresponding to the second transmission destination.

A print control method according to an eighteenth invention is characterized in that, in the seventeenth invention, the fourth step further comprising steps of judging communication settings used for transmitting print data to printing means of the first and the second transmission destinations; when it is judged that communication settings corresponding to the first and the second transmission destinations are different from each other, converting communication setting corresponding to the first transmission destination into communication setting corresponding to the second transmission destination; and transmitting the print data to printing means of the second transmission destination using the converted communication setting.

According to the second, the fourth, the sixth, the eighth, the fourteenth, the sixteenth and the eighteenth inventions, when initially designated communication setting such as a protocol for transmission and reception of print data by communication are different from communication setting which are set for a printer to be switched to, the communication setting is automatically converted. Hence, it is possible not only to reduce an uneconomical time waiting for printing and omit for an operator a job of requesting for printing once again, but also to eliminate for an operator a job of individually executing protocol conversion for every switching over.

A print control apparatus according to a seventh invention is a print control apparatus for transmitting print data supplied from outside to physical printing means or any one of a plurality of virtual printing means set in physical printing means which share a physical portion and operate independently of each other for parallelly processing a plurality pieces of print data, characterized by comprising: means for receiving print data through a data processing apparatus transmitted from a data transmitting apparatus which transmits print data using communication settings set separately for respective printing means; a table which shows whether the printing means are operating or not and/or information relating to print processing capabilities of the printing means; means for judging whether the printing means are available for printing or not based on the table; and means for, when it is judged that printing means designated as a first transmission destination of the print data is not available for printing, selecting other printing means which is available for printing as a second transmission destination.

A recording medium apparatus according to the thirteenth invention is a computer readable recording medium storing a program for causing a computer to transmit print data to physical printing means or a plurality of virtual printing means set in physical printing means which share a physical portion and operate independently of each other for parallelly processing a plurality pieces of print data, characterized by comprising: first program code means for causing a computer to set up a table which shows whether the printing means are operating or not and/or information relating to print processing capabilities of the printing means; second program code means for causing the computer to judge, based on the table set up by the computer, whether the printing means are available for printing; third program code means for causing the computer, when it is judged that printing means designated as a first transmission destination is not available for printing, to transmit print data to other printing means which is available for printing as a second transmission destination.

A print control method according to a seventeenth invention is a print control method for printing by transmitting print data to physical printing means or a plurality of virtual printing means set in physical printing means which share a physical portion and operate independently of each other for parallelly processing a plurality pieces of print data, characterized by comprising: a first step of referring to a table which shows whether the printing means are operating or not and/or information relating to print processing capabilities of the printing means; a second step of judging whether the printing means are available for printing or not based on the table; a third step of, when it is judged that printing means designated as a first transmission destination of print data is not available for printing, selecting other printing means available for printing as a second transmission destination; and a fourth step of transmitting the print data to the printing means selected as the second transmission destination.

According to the seventh, the thirteenth and the seventeenth inventions, the print control apparatus or a computer comprises a table which shows whether respective printers, such as a physical printer and virtual printers, are operating or not, and whether a designated printer is operating or not is judged referring to the table. When the designated printer is operating (printing), a print request, for example, is automatically switched to other printer than the designated printer, thereby controlling such that a printer which is not operating performs printing. Hence, it is possible to reduce an uneconomical time waiting for printing and omit for an operator a job of requesting for printing once again.

Further, according to the seventh, the thirteenth, the seventeenth and the fifteenth inventions, the print control apparatus or a computer comprises a table which shows information relating to print processing capabilities of respective printers, such as a physical printer and virtual printers, and a processing capability (printing capability) of a designated printer is judged and a transmission rate of print data to the designated printer, for example, is judged referring to the table, to thereby judge whether the designated printer can print out the print data. When the designated printer can not print out the print data, a print request, for example, is automatically switched to other printer than the designated printer, thereby controlling such that a printer which is not operating performs printing. Hence, it is possible to reduce an uneconomical time waiting for printing and omit for an operator a job of requesting for printing once again. In addition, since the designated printer is automatically switched while checking a condition, such as a transmission rate of print data, against the printing capability of the designated printer, a network which is capable of realizing high-speed communication will not be unnecessarily occupied with transmission of print data which is beyond the processing capability (printing capability) of the designated printer. Further, the printing capability may include a data transmission rate on a path in the network for transmitting from a transmission source of the print data to the designated printer, so that even when the path in the network has a relatively low transmission rate, the network will not be nevertheless unnecessarily occupied. Hence, it is possible to prevent an overall throughput from decreasing.

A printing system according to a ninth invention is A printing system, characterized by comprising: a data transmitting apparatus for transmitting print data; a data processing apparatus for receiving print data transmitted from the data transmitting apparatus and transmitting received print data; and a printer as set forth in claim 1 or 2, or the printer and physical printing means, which receives print data transmitted from the data processing apparatus and processes received print data.

A printing system according to a tenth invention is a printing system, characterized by comprising: a data transmitting apparatus for transmitting print data; a data processing apparatus as set forth in claim 3 or 4 which receives print data transmitted from the data transmitting apparatus and transmits received print data; and a printer, or the printer and physical printing means, which comprises a plurality of virtual printing means sharing a physical portion and operate independently of each other for parallelly processing a plurality pieces of print data, receives print data transmitted from the data processing apparatus, and prints received print data.

A printing system according to an eleventh invention is a printing system, characterized by comprising: a data transmitting apparatus as set forth in claim 5 or 6 for transmitting print data; a data processing apparatus for receiving print data transmitted from the data transmitting apparatus and transmitting received print data; and a printer, or the printer and physical printing means, which comprises a plurality of virtual printing means sharing a physical portion and operate independently of each other for parallelly processing a plurality pieces of print data, receives print data transmitted from the data processing apparatus, and prints received print data.

A printing system according to a twelfth invention is a printing system, characterized by comprising: a data transmitting apparatus for transmitting print data; a data processing apparatus for receiving prnt data transmitted from the data transmitting apparatus and transmitting received print data; a print control apparatus as set forth in claim 7 or 8 for receiving print data transmitted from the data processing apparatus and transmitting received print data; and a printer, or the printer and physical printing means, which comprises a plurality of virtual printing means sharing a physical portion and operate independently of each other for parallelly processing a plurality pieces of print data, receives print data transmitted from the print control apparatus, and prints received print data.

According to the ninth, the tenth, the eleventh and the twelfth inventions, apparatuses in accordance with the respective inventions comprise tables which show whether respective printers, such as a physical printer and virtual printers, are operating or not, and whether a designated printer is operating or not is judged referring to the tables. When the designated printer is operating (printing), a print request, for example, is automatically switched to other printer than the designated printer, thereby controlling such that a printer which is not operating performs printing. Hence, it is possible to reduce an uneconomical time waiting for printing and omit for an operator a job of requesting for printing once again.

BRIEF DESCRIPTION OF THE DRAWINGS

FIG. 4 is a conceptual view showing print specification information which is treated as a print queue in the present invention;

FIG. 8 is a conceptual view showing a data format of a notification of message change in the present invention;

BEST MODE FOR CARRYING OUT THE INVENTION (First Preferred Embodiment)

In the following, the present invention will be described in relation to preferred embodiments with reference to the associated drawings.

Figure 1:
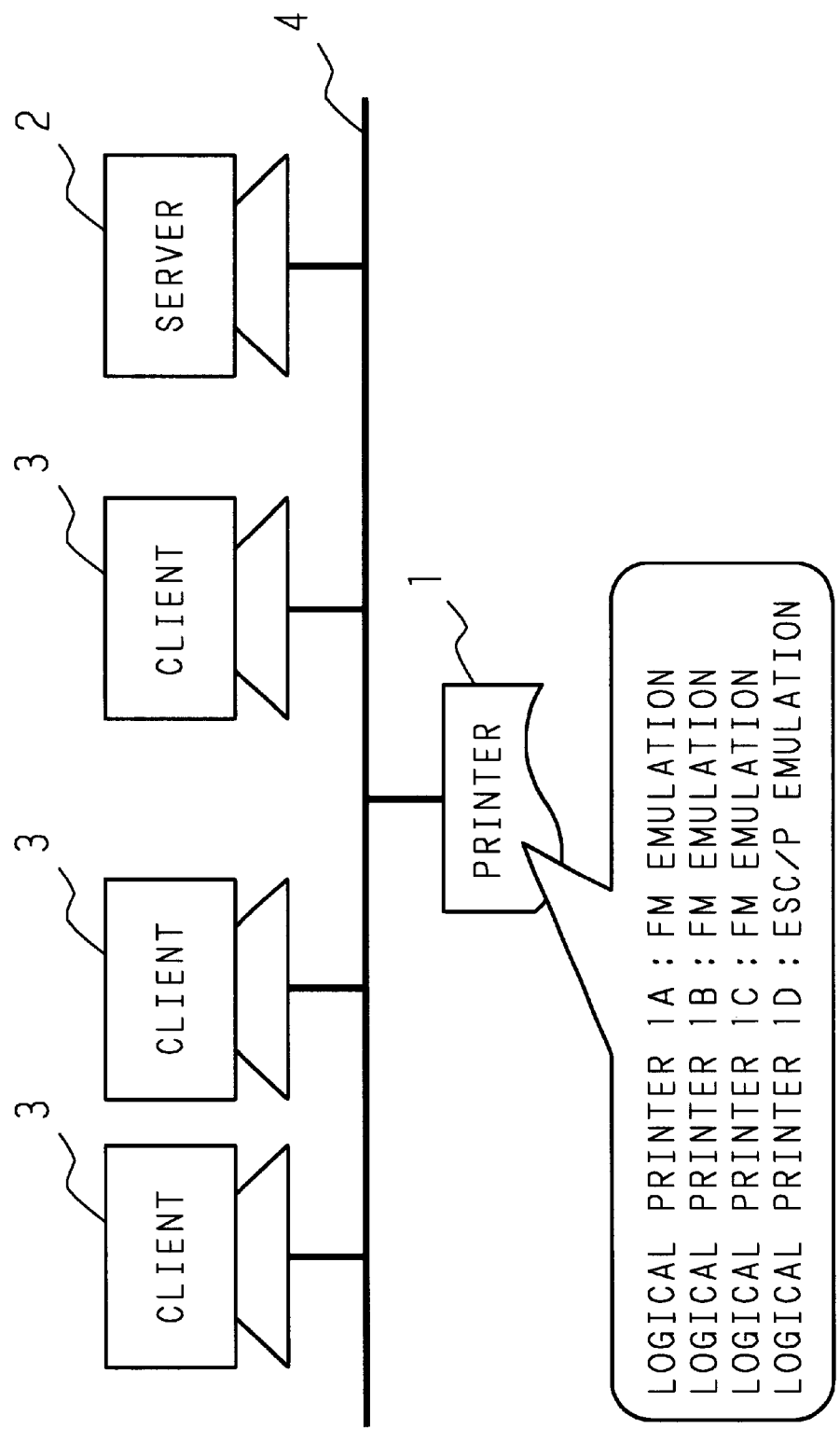
FIG. 1 is a block diagram showing a structure of a network which comprises a printer according to a first preferred embodiment of the present invention.

FIG. 1 is a block diagram showing a structure of a network which comprises a printer according to a first preferred embodiment of the present invention. In FIG. 1, denoted at 1 is a printer which is used as a virtual system printer. Four virtual logical printers 1A through 1D which can be equipped with various different emulations are set in the printer 1, and the printer 1 is connected to a network 4 such as a LAN. Also connected to the network 4 are a server computer (hereinafter referred to as the "server") 2 functioning a data processing apparatus which transmits print data to the printer 1, and client computers (hereinafter referred to as the "clients") 3, 3, . . . functioning data transmitting apparatuses which create print data and transmits the print data to the server 2. The server 2 and the clients 3, 3, . . . comprise communication interfaces for transmitting data to and receiving data from through the network 4 and monitors (not shown) for displaying processing statuses, respectively. The number of the logical printers to set in the printer 1 is not limited to four in the present invention, but may be any desired number which is two or larger.

Figure 2:
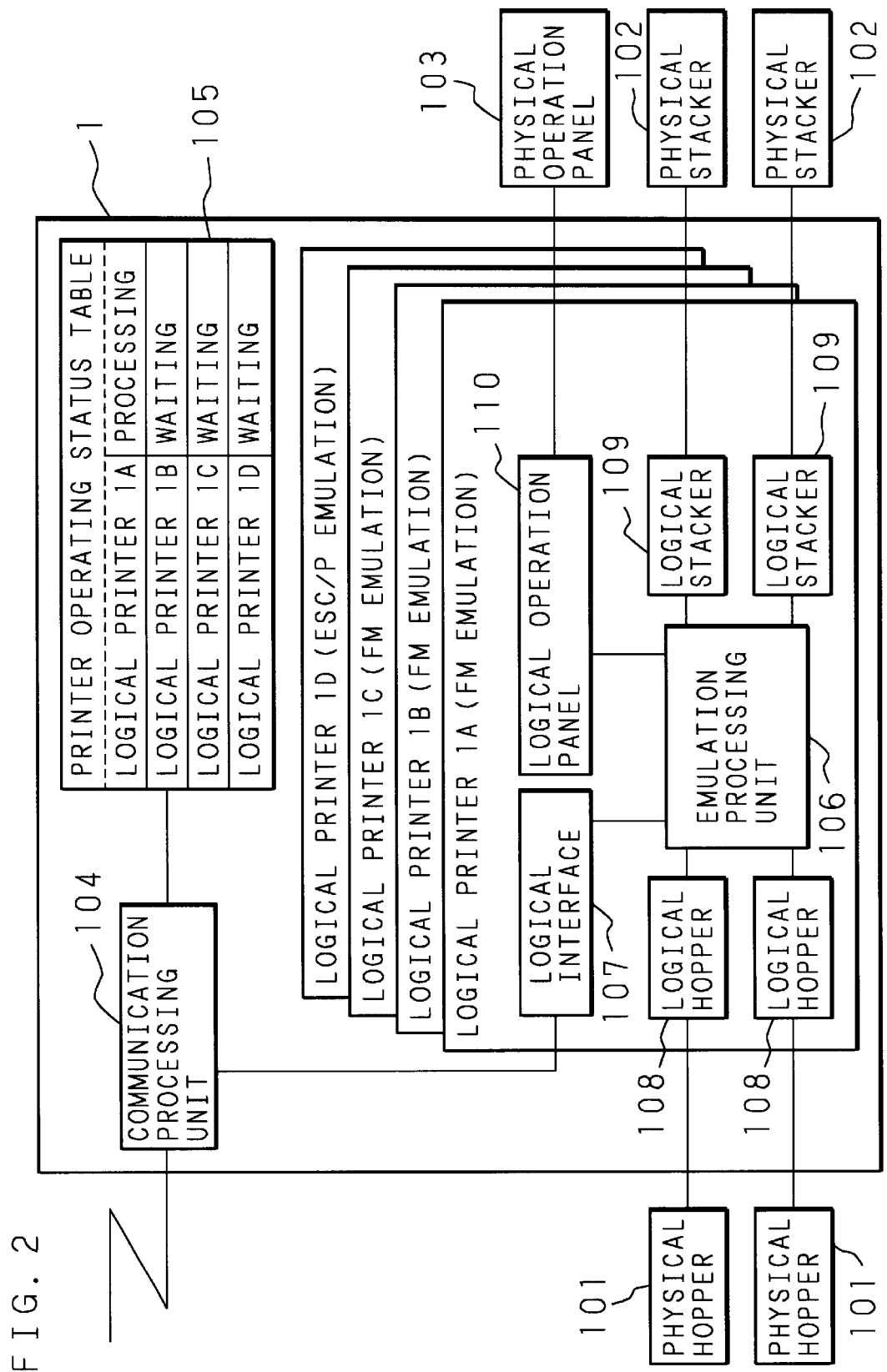
FIG. 2 is a conceptual view showing logical printers which are set in the printer according to the first preferred embodiment of the present invention.
Figure 3:
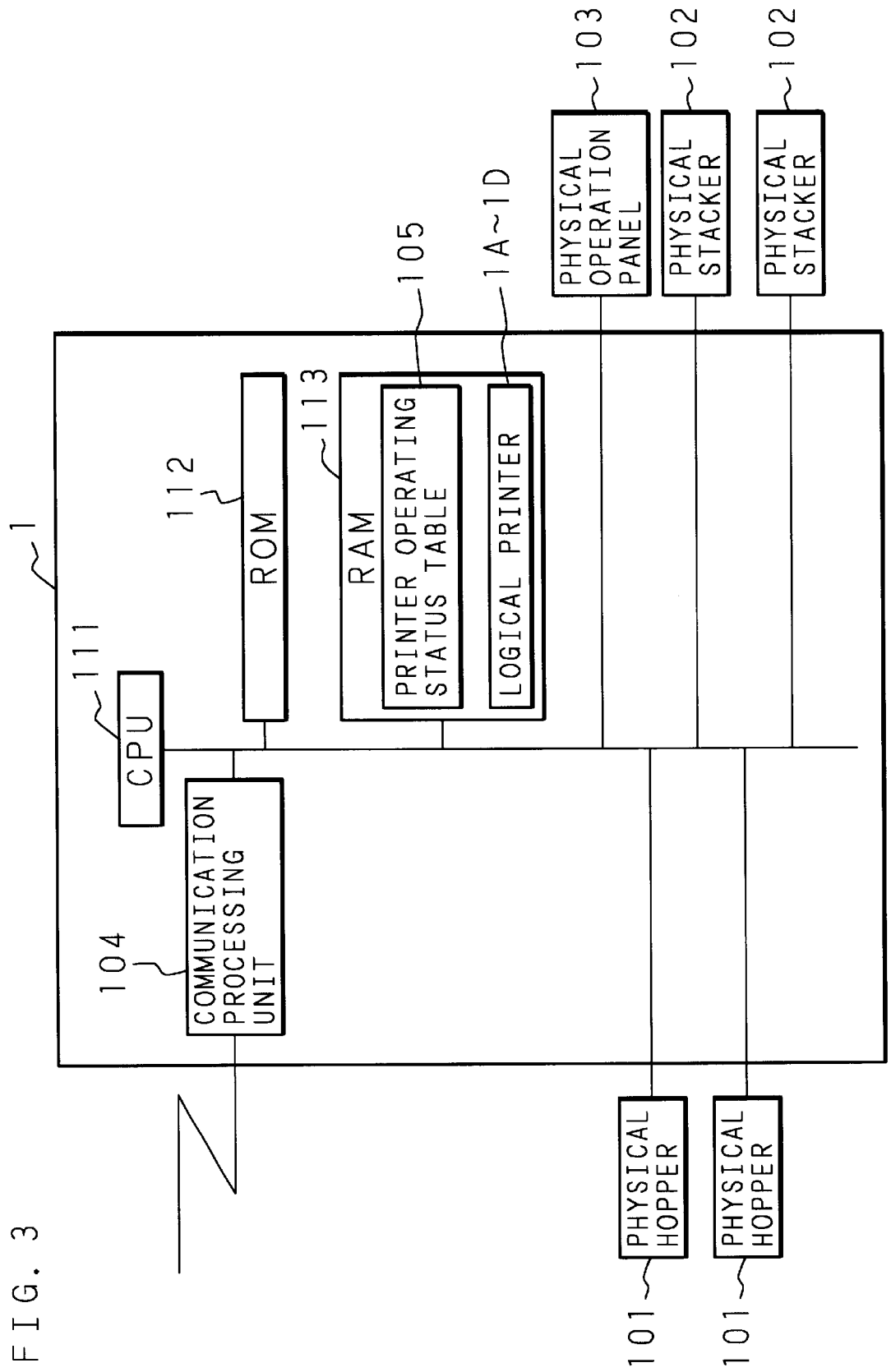
FIG. 3 is a block diagram showing a hardware structure of the printer according to the first preferred embodiment of the present invention.

FIG. 2 is a conceptual view showing the logical printers which are set in the printer, while FIG. 3 is a block diagram showing a hardware structure of the printer. As shown in FIG. 3, the printer 1 comprises, as physical printer components, a plurality of physical hoppers 101 which are paper feeding entrances for papers having different sizes from each other, one or a plurality of physical stackers 102 which are discharging exits for printed papers, and a physical operation panel 103.

Further, the printer 1 comprises a CPU 111. The CPU 111 reads a program from a ROM 112 in which various types of computer programs (hereinafter referred to as the "programs") in order to realize such a virtual system printer described above, and sets the logical printers 1A through 1D as those shown in FIG. 2 on a RAM 113 which stores various types of data created during execution of the programs.

The logical printers 1A through 1D are set as virtual logical printer components which perform (print) processing independently of each other and which correspond to physical printer components actually existing. The server 2 and the clients 3, 3, . . . recognize the logical printers 1A through 1D as four printers which are independent of each other, and transmit a print queue to any one of the logical printers 1A through 1D to which printing is requested. The logical printer which receives the print queue instructs processing to the logical printer component based on the contents of the print queue, whereby at the timing that the corresponding physical printer component is not executing processing regarding other logical printers, the instruction is given to the physical printer component from the logical printer component and processing regarding actual printing is executed.

Further, the printer 1 comprises a communication processing unit 104 which transmits data to and from the server 2 and performs various types of data processing, and the communication processing unit 104 transmits data to and from the logical printers 1A through 1D. Operating statuses of the respective logical printers 1A through 1D are stored in a printer operating status table 105 which is set on the RAM 113, and the contents of the printer operating status table 105 are updated every time the operating statuses of the logical printers 1A through 1D change.

The respective logical printers 1A through ID respectively comprise emulation processing units 106, 106, . . . which are equipped with emulations corresponding to the specifications of the clients 3, 3, . . . which create print data. The emulation processing units 106, 106, . . . each receives a print queue from a logical interface 107 on the associated logical printer which transfers print data with the communication processing unit 104, and decode information of the print queue written by the command system of the specifications of the client 3 which is a source unit, and instructs print actions, such as selection of print papers, printing and selection of the discharging exit, to the associated logical printer component.

Assume that the logical printer 1A, the logical printer 1B and the logical printer 1C are set to FM emulations while the logical printer 1D is set to an ESC/P emulation and the logical printers can decode print queues which are written in the command systems of the respective specifications. In addition to these emulations, each logical printer can be set to other emulations as well, a JEF emulation and a PS2 (Post Script Level 2) emulation, which are emulations for standard printers connected to a LAN, for instance.

The emulation processing unit 106 instructs a logical hopper 108 which is a logical printer component of the associated logical printer to feed a paper of a size identified in the information based on the print queue, and the logical hopper 108 instructs a physical hopper 101 to execute a paper feed action at the timing that it is possible to feed a paper of the designated size.

Further, the emulation processing unit 106 provides a logical stacker 109, which is a logical printer component of the associated logical printer, with an instruction regarding a discharging exit and a discharging method for discharging the printed paper based on the information included in the print queue, and the logical stacker 109 instructs a physical stacker 102 to discharge the printed paper by the designated discharging method at the timing that it is possible to use the designated discharging exit.

When a user further enters interrupt processing, such as suspension of printing, using the physical operation panel 103, information regarding the interrupt processing is given from the physical operation panel 103 to a logical operation panel 110 which is a logical printer component of the associated logical printer, and the logical operation panel 110 sends the information regarding the interrupt processing to the emulation processing unit 106.

FIG. 4 is a conceptual view showing print specification information which is treated as a print queue. Print data created by the clients 3 are transmitted to the server 2, and the server 2 creates, in an area on a memory (not shown) of the server 2, print queues which include print specification information, such as the requesting source clients regarding the respective pages, next print specification information, a page count, single side/double side print information, paper size information, designated paper feed hopper, designated discharge stacker and the contents of the print data, based on the print data.

In the printer 1, when a print request designating a logical printer to use is received from the server 2, a path is set through which the designated logical printer can receive the print queue from the server 2, and the designated logical printer performs various types of processing based on print specification information of the print queue received on the path. Thus, the printer 1 performs printing.

When the designated logical printer in accordance with the contents of the printer operating status table 105 is "processing", other logical printer which can perform printing is selected, the path to the initially designated logical printer is released, and the server 2 is notified of the updated operating statuses of the logical printers in order to set up a path to the selected logical printer.

In this manner, the plurality of logical printers 1A through 1D are virtually set in the printer 1 and the plurality of logical printers 1A through ID operate within the single printer 1, thereby realizing multi-emulations which correspond to different emulations of the plurality of clients 3,3, . . . .

Further, since the emulation processing units 106, 106, . . . of the respective logical printers 1A through 1D transfer information with the logical printer components in a similar manner to that for transferring information with the physical printer components, even when it is necessary to deploy a new emulation, it is easy to port the emulation program.

Next, a processing sequence when a print request is made to the printer according to the present invention will be described.

Figure 5:
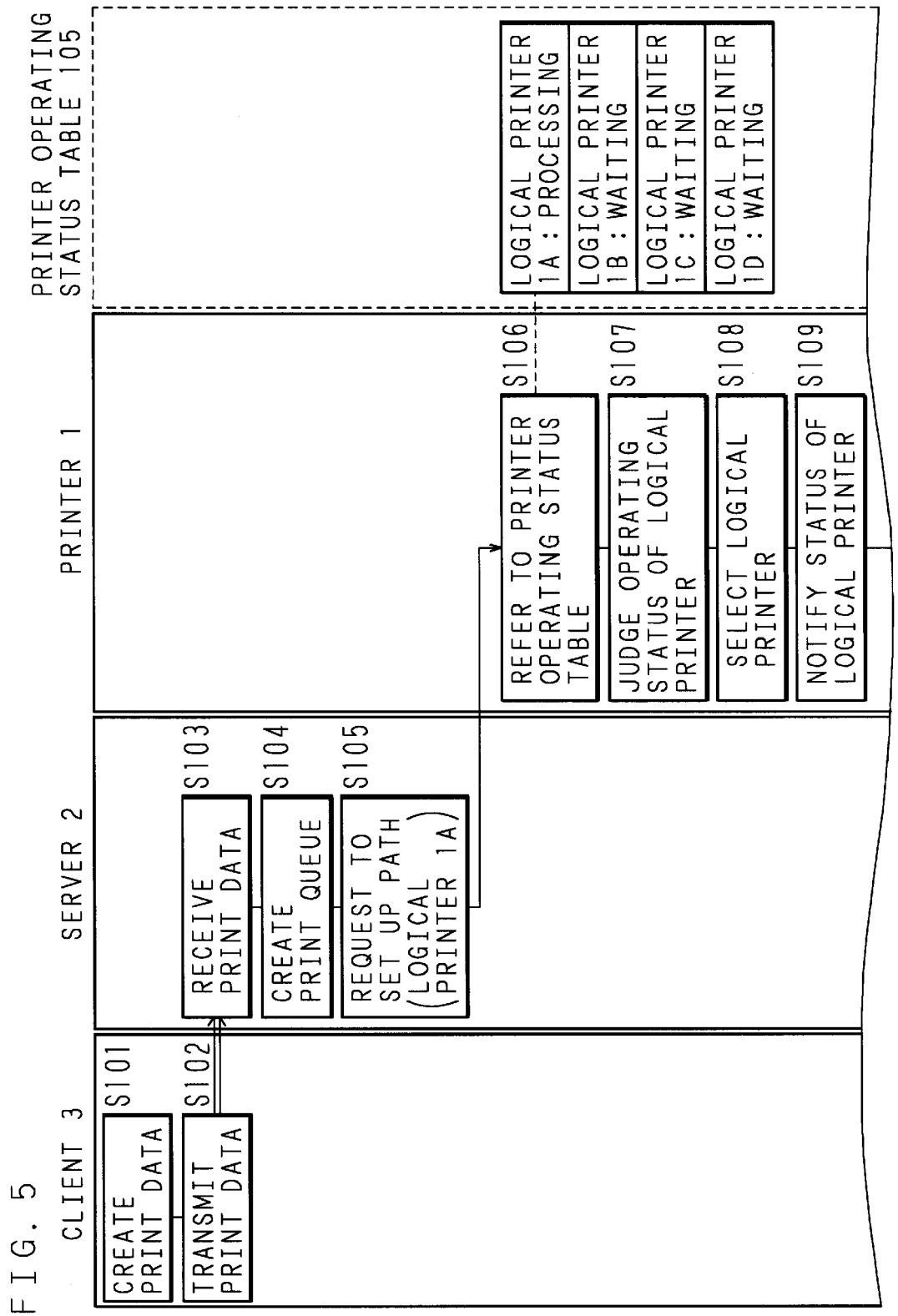
FIG. 5 is a flow chart showing data processing of a server computer, client computers and a printer in the first preferred embodiment of the present invention.
Figure 6:
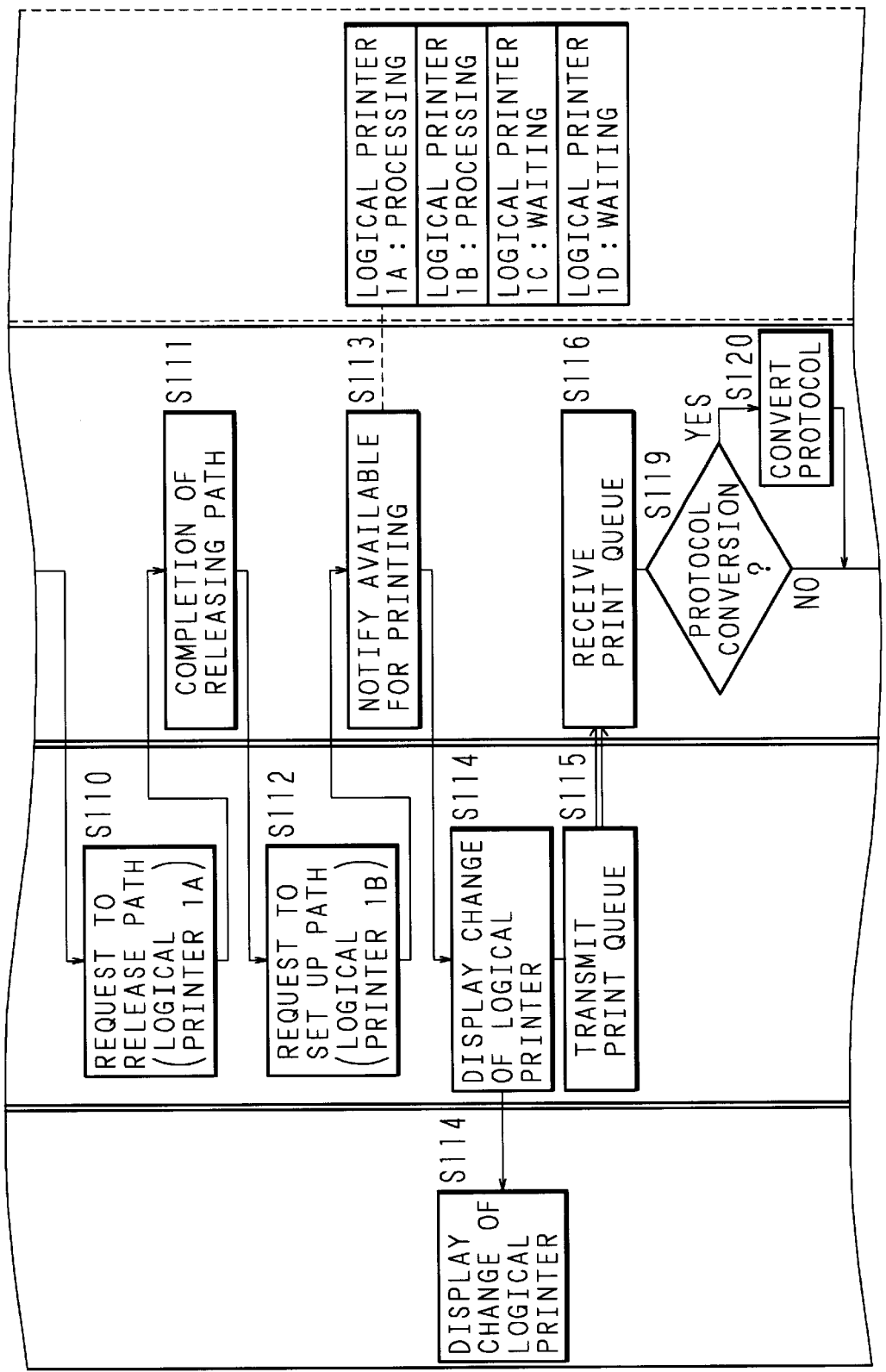
FIG. 6 is a flow chart showing the data processing of the server computer, the client computers and the printer in the first preferred embodiment of the present invention.
Figure 7:
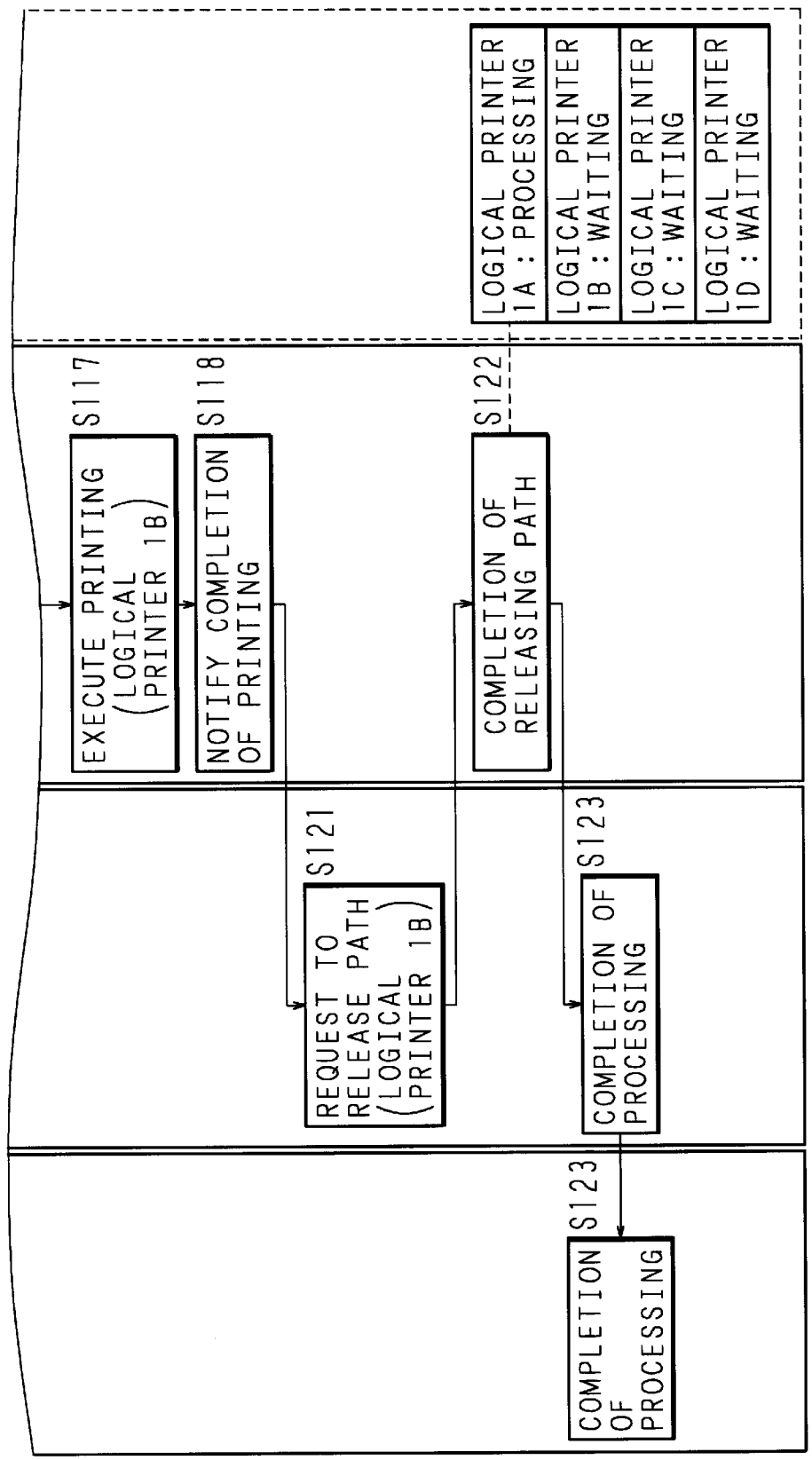
FIG. 7 is a flow chart showing the data processing of the server computer, the client computers and the printer in the first preferred embodiment of the present invention.

FIG. 5, FIG. 6 and FIG. 7 are flow charts showing data processing of the server, the clients and the printer according to the first preferred embodiment. The client 3 creates by the FM emulations print data which are to be printed by the logical printer 1A (S101), and transmits to the server 2 (S102). The server 2 receives the print data (S103), creates a print queue based on the print data (S104), and requests as a print request to set up a path as the print request to the logical printer 1A of the printer 1 (S105).

The printer 1 which receives print request refers to the printer operating status table 105 (S106), judges an operating status of the logical printer 1A (S107), and when the logical printer 1A is "unoccupied", transmits a notice of availability to the server 2 and starts printing.

When the logical printer 1A is "processing" and the logical printers 1B through 1D are "unoccupied" as shown in FIG. 2, the printer 1 selects the logical printer 1B, which is an FM emulation having the same specifications as the logical printer 1A, as an available logical printer (S108), and notifies the server 2 of the updated operation statuses of the logical printers so as to change to a path to the logical printer 1B (S109).

The server 2 requests, in accordance with the notice from the printer 1, the logical printer 1A to release the path (S110). After releasing the path, the logical printer 1A notifies the server 2 of this (S111), and the server 2 requests the logical printer 1B to set up a path (S112).

Confirming that the logical printer 1B is "unoccupied", the printer 1 notifies the server 2 and the client 3 that the logical printer 1B which is now switching from the logical printer 1A is available for printing (S113), thereby updating the printer operating status table 105 such that the operating status of the logical printer 1B becomes "processing".

Figure 9:
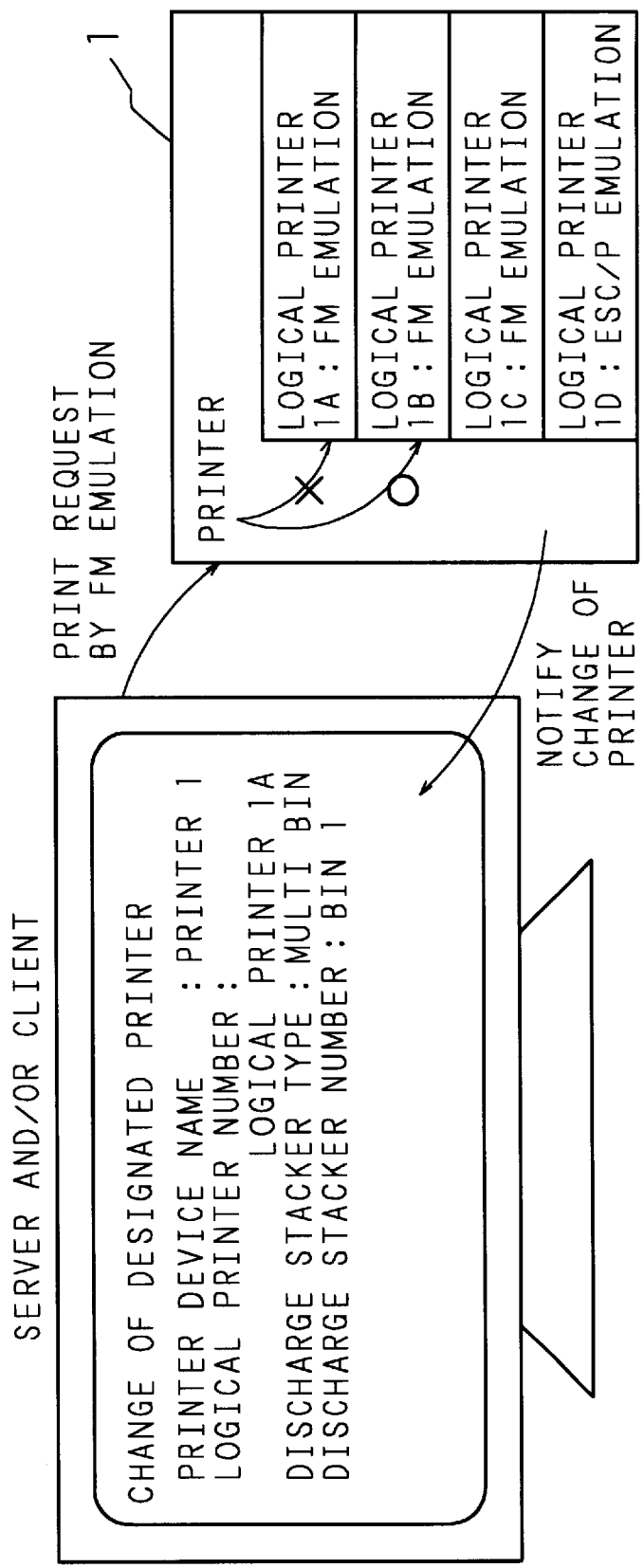
FIG. 9 is an explanatory diagram for describing the notification of printer change in the present invention.

FIG. 8 is a conceptual view showing a data format of a notification of change message, and FIG. 9 is an explanatory diagram for describing the notification of change printer. Designated printer change information, such as a requesting source client, a printer device name, a logical printer number, a discharge stacker type and a discharge stacker number, is transmitted to the server 2 and the client 3 as shown in FIG. 8, and monitors of the server 2 and/or the client 3 display information, such as the change of designated printer, the printer device name, the logical printer number, the discharge stacker type and the discharge stacker number, as shown in FIG. 9 (S114), and therefore, it is possible for a user to recognize the change of logical printer and its contents, and hence, to prevent the printed matter from getting lost.

The server 2 thereafter transmits a print queue to the logical printer 1B of the printer 1 (S115). The logical printer 1B receives the print queue (S116), printing is executed using the logical printer 1B (S117), and after the printing is completed, the logical printer 1B notifies the server 2 of the completion of the printing (S118).

Since the print queue received at this stage is formed by print data which postulate printing by the logical printer 1A, even when the logical printer 1A and the logical printer 1B are the same emulations, protocols which are the settings for communication may be different from each other. Hence, after the printer 1 receives the print queue, the protocols of the logical printer 1A and the logical printer 1B are judged. When it is necessary to execute protocol conversion (S119), the protocol is converted (S120).

The server 2 requests the logical printer 1B to release the path (S121). The printer 1, after the path to the logical printer 1B is released, updates such that the operating status of the logical printer 1B becomes "unoccupied" in the printer operating status table 105, and notifies, through the server 2, the clients 3 of the completion of the processing (S122). The server 2 and the client 3 accordingly complete processing (S123).

Figure 10:
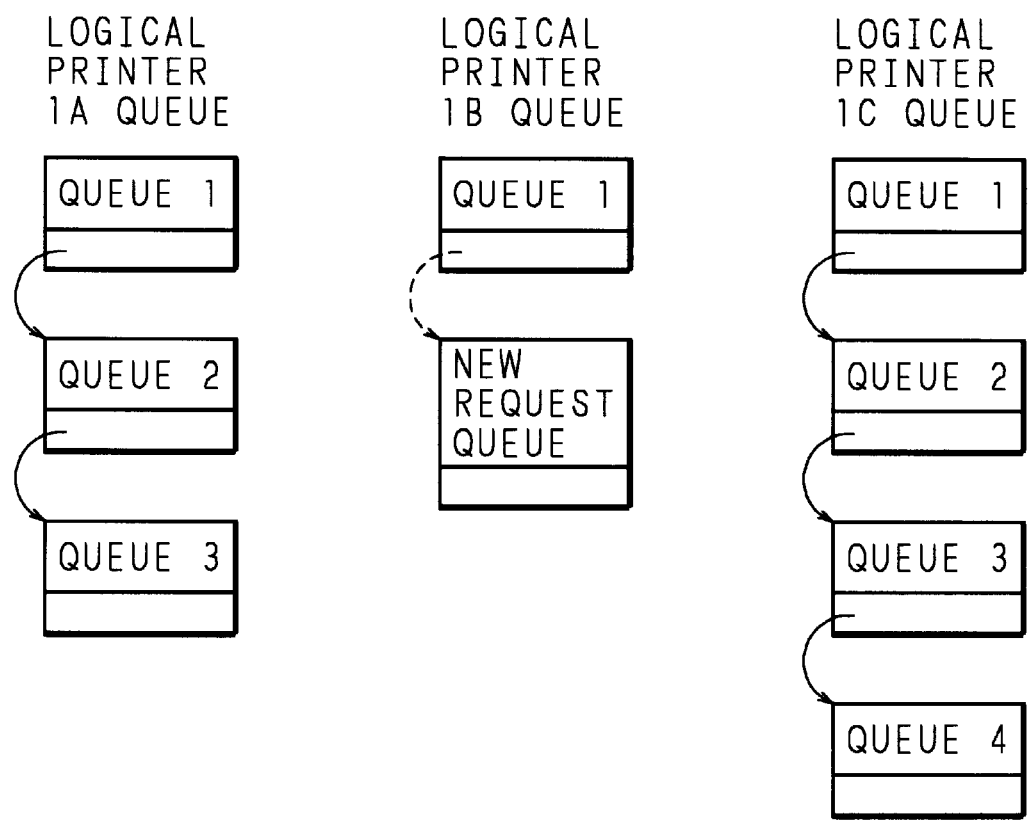
FIG. 10 is a conceptual view showing processing of print queues in logical printers in the present invention.
Figure 11:
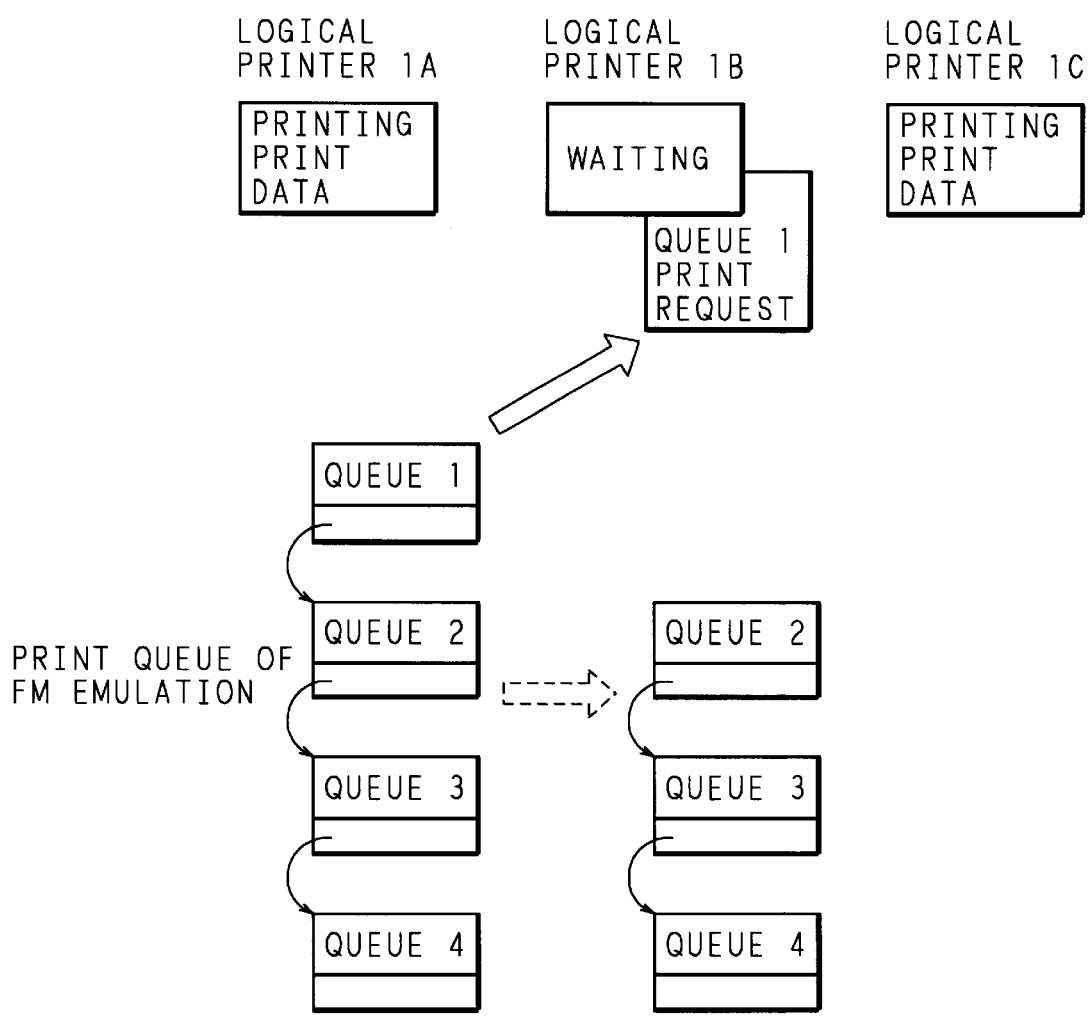
FIG. 11 is a conceptual view showing processing of print queues in the logical printers in the present invention.

FIG. 10 and FIG. 11 are conceptual views showing print queue processing of the logical printers. When the logical printers of the same emulations are all "processing" at the time of a print request, as shown in FIG. 10, the request is queued in at the end of a print queue indicating "processing" or "waiting for printing" so as to invoke a print wait state. With respect to queuing at this stage, the logical printer to be selected may be the logical printer which bears the fewest print queues of the print wait state at the time of the print request.

Further, the processing for where the logical printers of the same emulations are all "processing" may be, as shown in FIG. 11, that print request queues from the same emulations are all set "waiting for printing", and when the logical printer of the corresponding emulation becomes "unoccupied", the logical printer in the "unoccupied" state is requested to print.

In this manner, the present invention is directed to a structure in which the printer 1 comprises the printer operating status table 105 which shows operating statuses of the logical printers and print control is executed with reference to the printer operating status table 105.

(Second Preferred Embodiment)

A second preferred embodiment relates to a structure which allows a server as a data processing apparatus to perform the print control according to the first preferred embodiment so as to implement the print control method according to the present invention in a printer which can not execute the print control according to the first preferred embodiment. The structure also permits not only to select among logical printers within a single printer but also to request printing to other printer (a physical printer or a logical printer) connected to a network.

Figure 12:
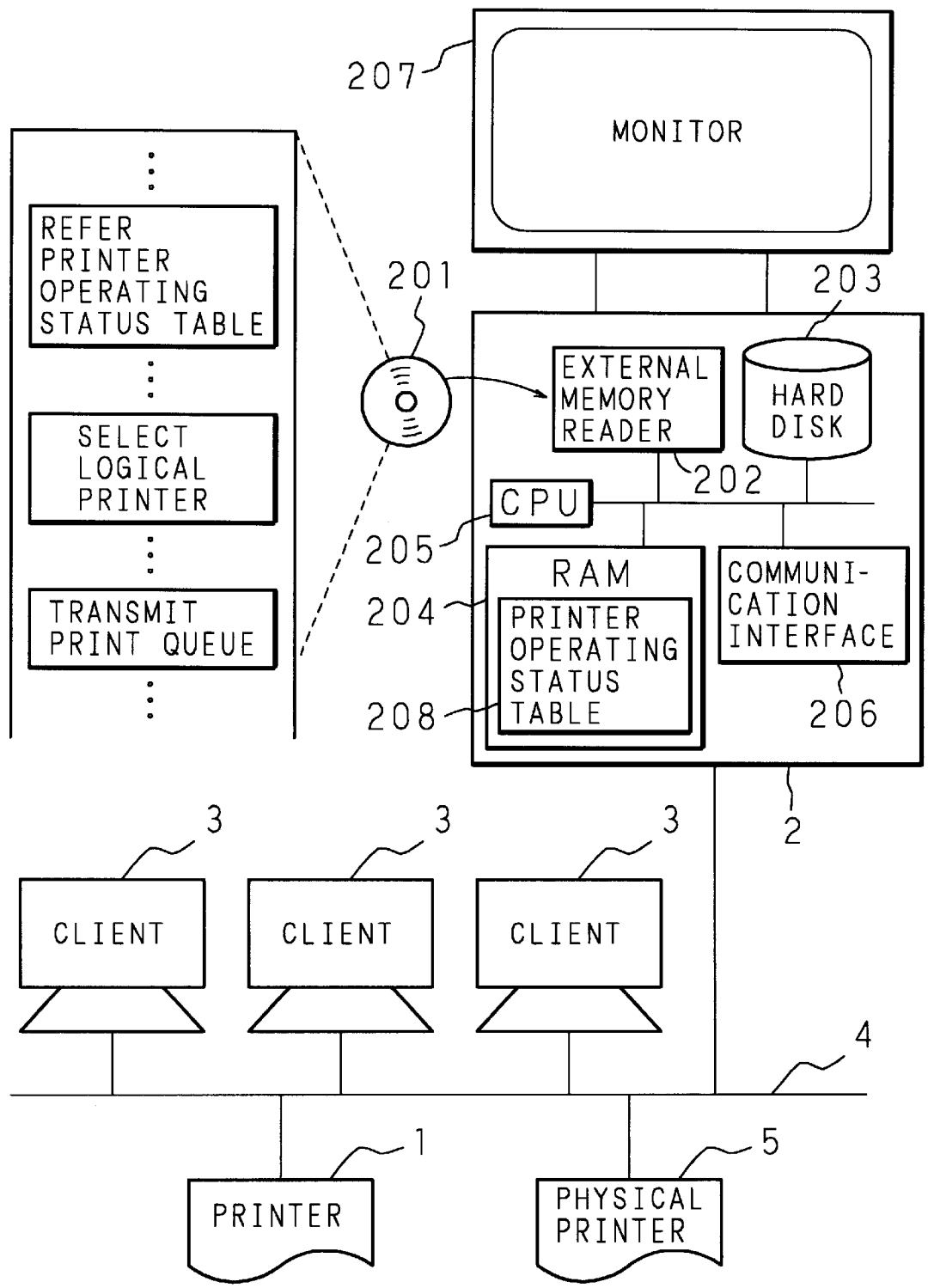
FIG. 12 is a block diagram showing structure of a server computer and a network comprising the same according to a second preferred embodiment of the present invention.

FIG. 12 is a block diagram showing structure of a server according to the second preferred embodiment of the present invention and a network comprising the same. In FIG. 12, denoted at 2 is the server, and the server 2 is connected to a network 4. Connected to the network 4 are clients 3, 3, . . . , a printer 1 which is used as a virtual system printer, and a physical printer 5 which is not a virtual system printer.

The server 2 comprises an external memory reader 202, such as a CD-ROM drive, which reads information from a recording medium 201, such as a CD-ROM, in which information such as the programs according to the present invention is recorded. Information read by the external memory reader 202 is stored in a hard disk 203 which is built-in within the server 2.

A CPU 205 reads the information from the hard disk 203, a RAM 204 temporarily stores the information, and the information is executed on an OS(Operating System) installed in the server 2, whereby the print control method according to the present invention is realized. The server 2 further comprises a communication interface 206 which transmits and receives data through the network 4, and a monitor 207 which displays an operating status of the present invention.

A connection may be made to an external server computer using an external network line and the programs according to the present invention may be downloaded from a recording medium which is built-in within the server computer and which holds the programs according to the present invention to thereby store the programs in the hard disk 203 within the server 2, instead of reading the programs according to the present invention from the recording medium 201.

Figure 13:
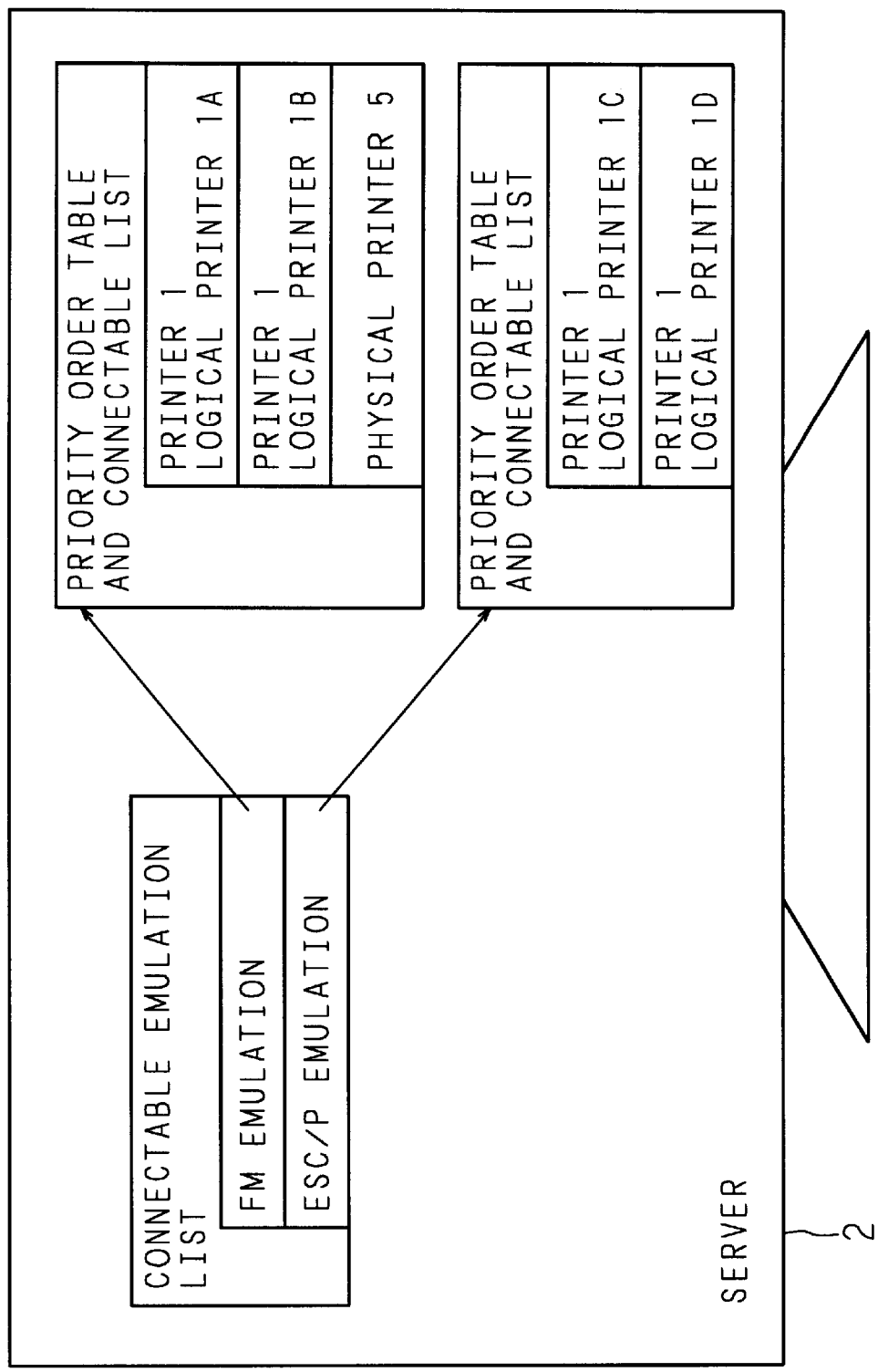
FIG. 13 is a conceptual view showing a priority order table and connectable printer list in the present invention.

FIG. 13 is a conceptual view showing a priority order table and connectable printers list. In order to control printing of a plurality of logical and physical printers, the server 2 manages information regarding these printers with reference to the priority order table and connectable printers list shown in FIG. 13.

Figure 14:
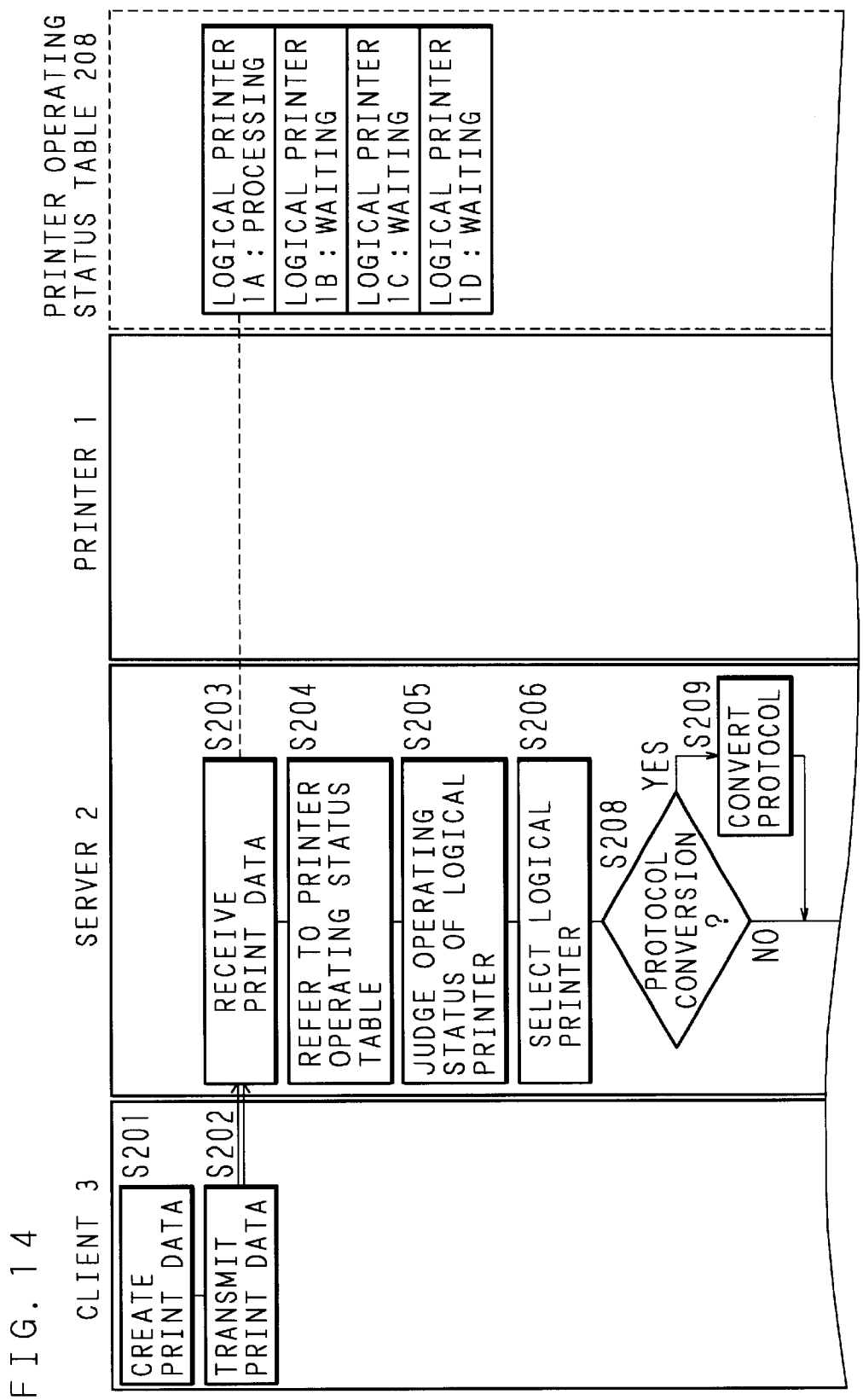
FIG. 14 is a flow chart showing data processing of a server computer, client computers and a printer in the second preferred embodiment of the present invention.
Figure 15:
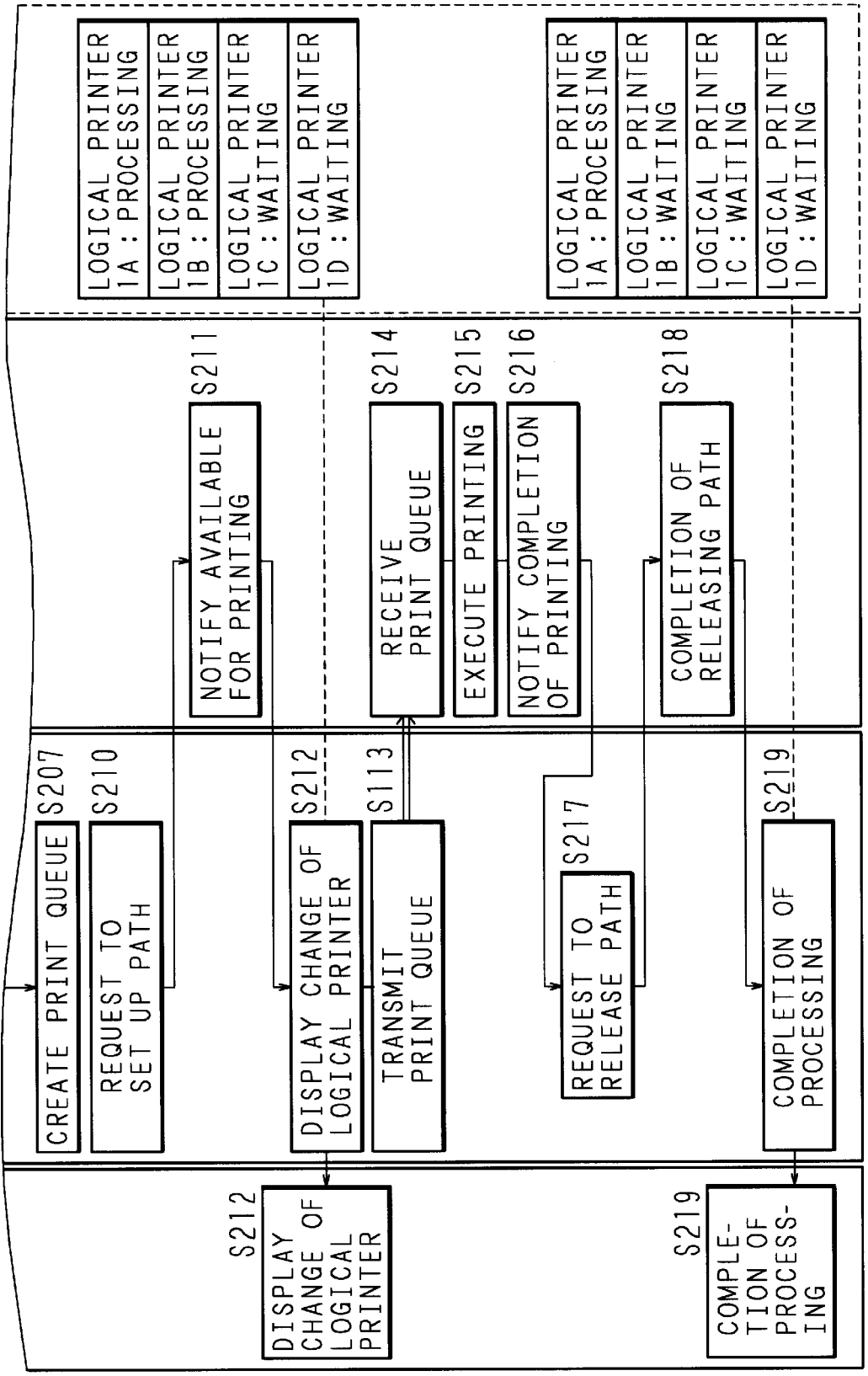
FIG. 15 is a flow chart showing the data processing of the server computer, the client computers and the printer in the second preferred embodiment of the present invention.

FIG. 14 and FIG. 15 are flow charts showing data processing of the server, the clients and the printers in the second preferred embodiment. The client 3 creates, by FM emulations, print data to be printed by the logical printer 1A (S201), and transmits to the server 2 (S202). The server 2 receives the print data (S203), refers to a printer operating status table 208 set on the RAM 204 of the server 2 (S204), judges an operating status of the logical printer 1A (S205), and when the logical printer 1A is "unoccupied", after creating a print queue based on the print data, requests the logical printer 1A to set a path, transmits the print queue and printing is started.

When the judgment on the operating status of the logical printer 1A identifies that the logical printer 1A is "processing" while the logical printers 1B through 1D and the physical printer 5 are "unoccupied", the server 2 selects the logical printer 1B which is an "unoccupied" and FM emulation having the same specifications as the logical printer 1A as an available logical printer (S206), and a print queue is created based on the print data (S207). At this time, if there are a plurality of "unoccupied" logical and physical printers which are FM emulations, the server 2 selects in accordance with the priority order which is described in the priority order table.

Since the print queue received from the client 3 is formed by print data which postulate printing by the logical printer 1A, even when the logical printer 1A and the logical printer 1B are the same emulations, protocols may be different. Hence, after selecting among the logical printers, the server 2 judges the protocols of the logical printers 1A and 1B, and when it is necessary to execute protocol conversion (S208), the protocol is converted (S209).

The server 2 thereafter requests the logical printer 1B to set up a path (S210). Confirming that the logical printer 1B is "unoccupied", the printer 1 notifies the server 2 and the clients 3 that the logical printer 1B is available for printing (S211), and monitors (not shown) of the server 2 and/or the client 3 display the change of logical printer, a printer device name, a logical printer number, a discharge stacker type and a discharge stacker number (S212). At this stage, the server 2 updates the operating status of the logical printer 1B to "processing" in the printer operating status table 208.

The server 2 thereafter transmits a print queue to the logical printer 1B of the printer 1 (S213). The logical printer 1B receives the print queue (S214), printing is performed using the logical printer 1B (S215), and after the printing is completed, the logical printer 1B notifies the server 2 of the completion of the printing (S216).

The server 2 requests the logical printer 1B to release the path (S217), and after the path to the logical printer 1B is released (S218), the printer 1 notifies the clients 3 through the server 2 of the completion of the processing and the server 2 and the clients 3 complete processing (S219). At this stage, the server 2 updates the operating status of the logical printer 1B to "unoccupied" in the printer operating status table 208.

Meanwhile, when the logical printers of emulations which can be used by the printer 1 are all "processing", load distribution control processing may be performed in which print queues are transmitted to the physical printer 5 and a print load upon the printer 1 is distributed.

Figure 16:
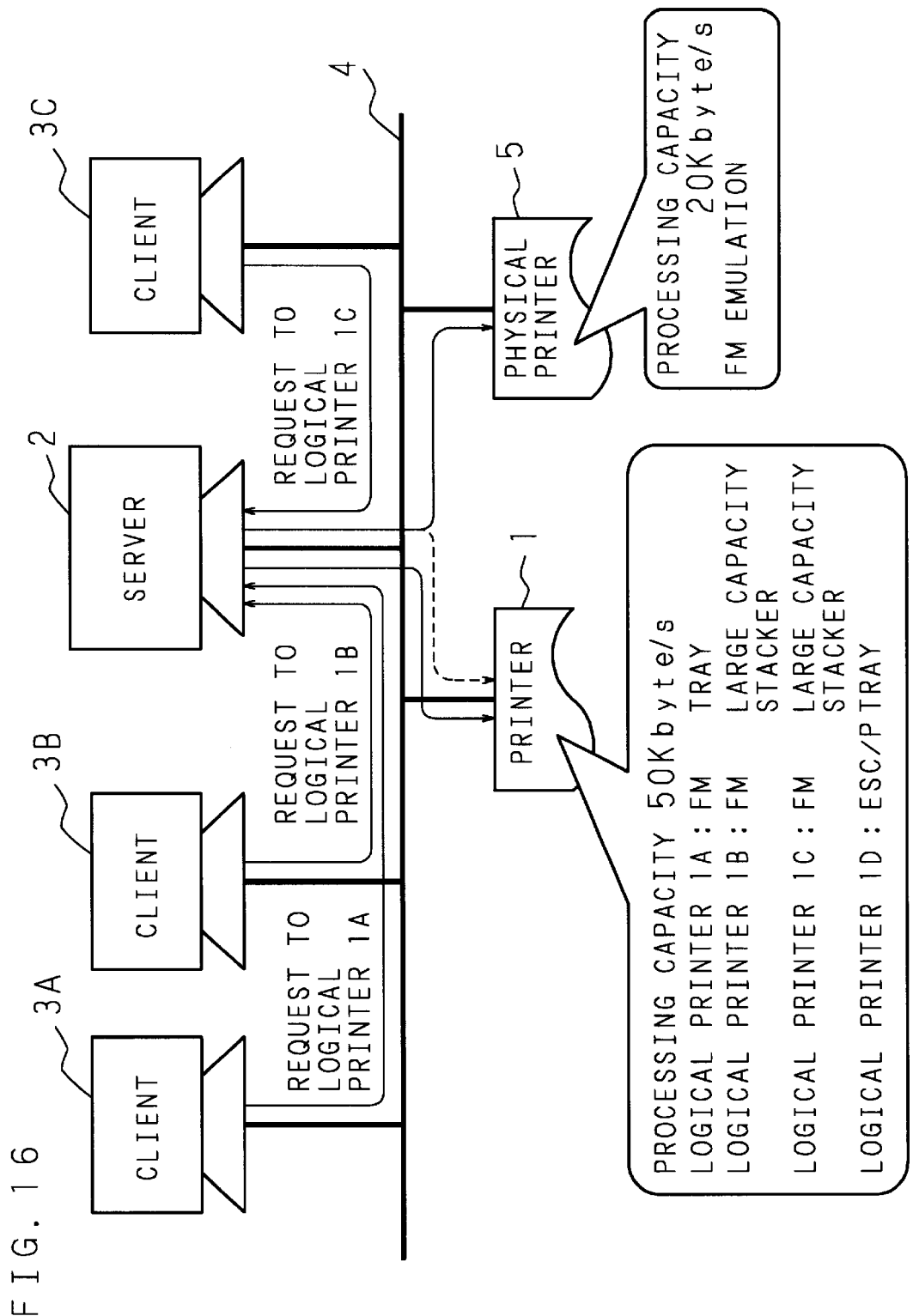
FIG. 16 is an explanatory diagram for describing an example of load distribution control processing of the second preferred embodiment of the present invention.
Figure 17:
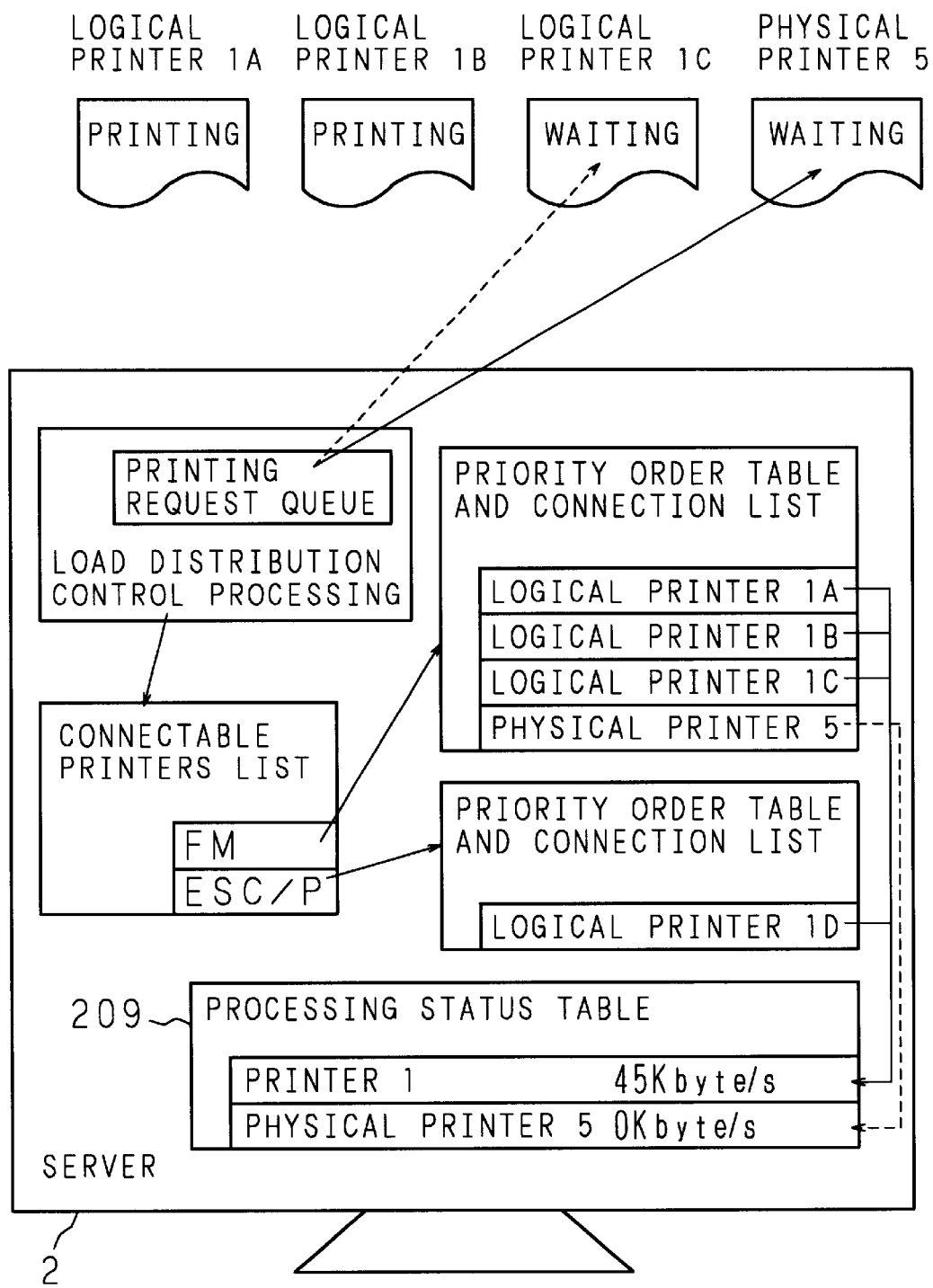
FIG. 17 is a conceptual view showing a priority order table/connection list and a processing status table in the present invention.

FIG. 16 is an explanatory diagram for describing an example of the load distribution control processing, and FIG. 17 is a conceptual view showing a priority order table/connection list and a processing status table. The load distribution control processing according to the present invention will now be described with reference to FIG. 16 and FIG. 17. In FIG. 16, the clients are denoted at 3A, 3B, 3C, . . . so as to distinguish the plurality of clients from each other.

In a case that there is a print request from the client 3A to the logical printer 1A with a processing load of 20 Kbyte/s and there is a print request from the client 3B to the logical printer 1B with a processing load of 25 Kbyte/s in a printer 1 whose capacity as other communication settings is 50 Kbyte/s, if the client 3C issues a print request to the logical printer 1C with a processing load of 15 Kbyte/s, as a print queue from the client 3C is transmitted to the logical printer 1C, a total processing load as yet other communication settings upon the printer 1 becomes 60 Kbyte/s which is more than the processing capacity of 50 Kbyte/s of the printer 1. Hence, a print speed of the printer 1 slows down, whereby it is impossible to print efficiently.

Using a processing status table 209 (See FIG. 17.) which shows processing loads upon the respective printers which are set on the RAM 204, the server 2 monitors the total of the processing loads upon the respective printers, and when print requests exceed the processing loads, retrieves a printer which has a margin of a processing load among the printers which are the same emulations as the logical printer 1C, transmits a print queue to the retrieved physical printer 5, and executes printing.

Figure 18:
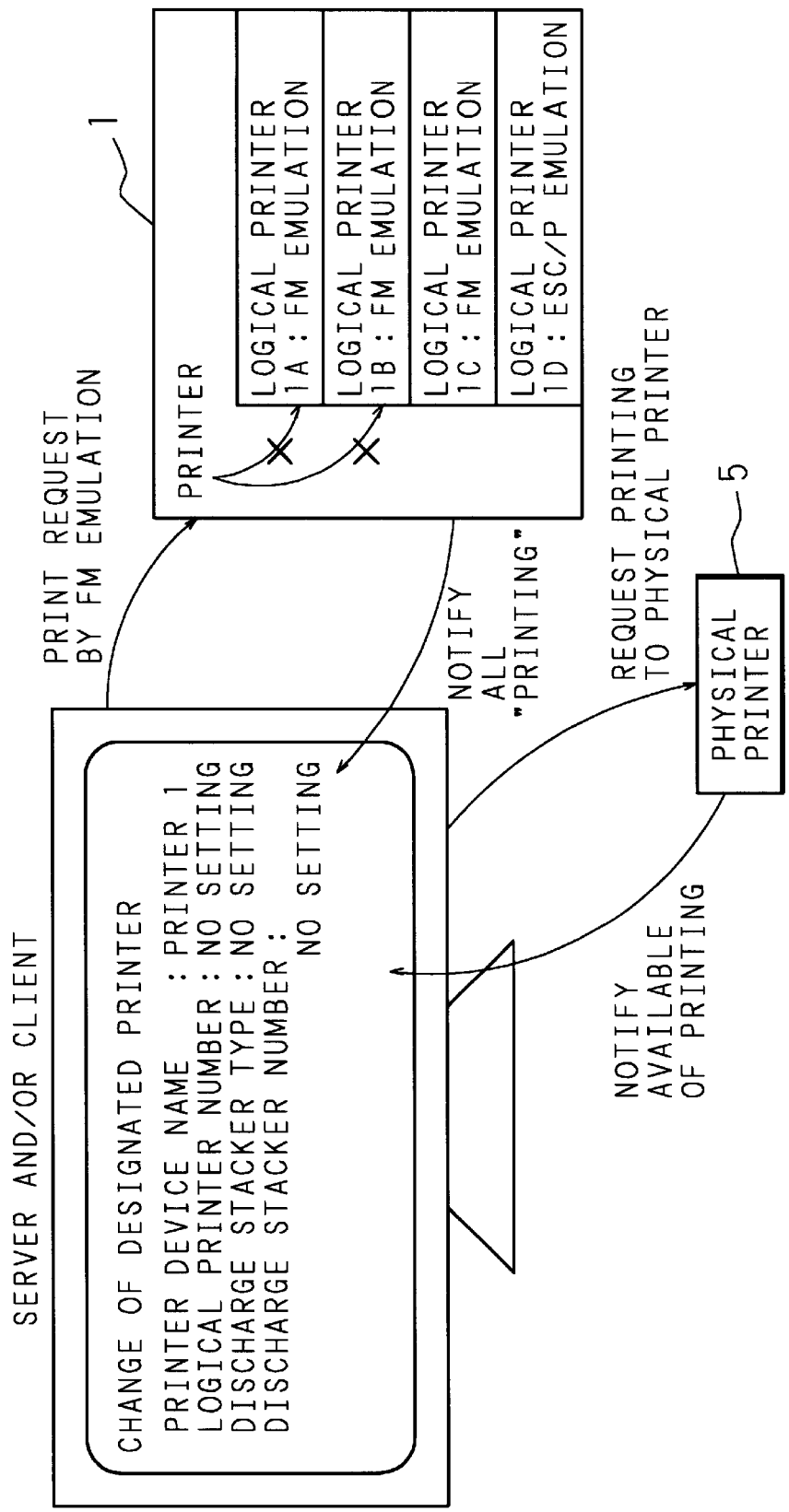
FIG. 18 is an explanatory diagram for describing a notification of printer change in the second preferred embodiment of the present invention.

FIG. 18 is an explanatory diagram for describing a notification of printer change. As shown in FIG. 8, designated printer change information, such as a requesting source client, a printer device name, a logical printer number, a discharge stacker type and a discharge stacker number, is transmitted to the server 2 and the client 3C. Monitors of the server 2 and/or the client 3C display the change of printer, the printer device name, the logical printer number, the discharge stacker type and the discharge stacker number, as shown in FIG. 18.

This makes it possible for a user to recognize the change of printer and its contents, and hence, to prevent the printed matter from getting lost.

As a further use of the load distribution control processing, it is possible to have first half pages of print data representing a large number of pages printed by the logical printer 1A and second half pages printed by the physical printer 5 so as to distribute a print load, shorten a printing time and improve a throughput of the entire system.

In addition, when processing capabilities of all printers which can accept print requests are surpassed, a throughput as a whole may be given a priority to temporarily stop print requests.

While the foregoing has described an example using two printers 1A and 5 which are already recognized by the server 2, if a printer which is not recognized by the server 2 but yet connectable is included in the connectable printers list, even when the two printers are both "processing", the server 2 can automatically perform processing, such as set-up of a driver, for the new connectable printer, recognize this as a printer which can accept a print request, and make a print request.

Other essential structure and operations are similar to the essential structure and operations described earlier in relation to the first preferred embodiment, and therefore, will be simply denoted at the same reference numbers without detailed explanation.

(Third Preferred Embodiment)

A third preferred embodiment relates to a structure which allows clients as data processing apparatuses to perform the print control according to the second preferred embodiment, and as such, is effective for a printing system in which a processing load upon a server is large.

Figure 19:
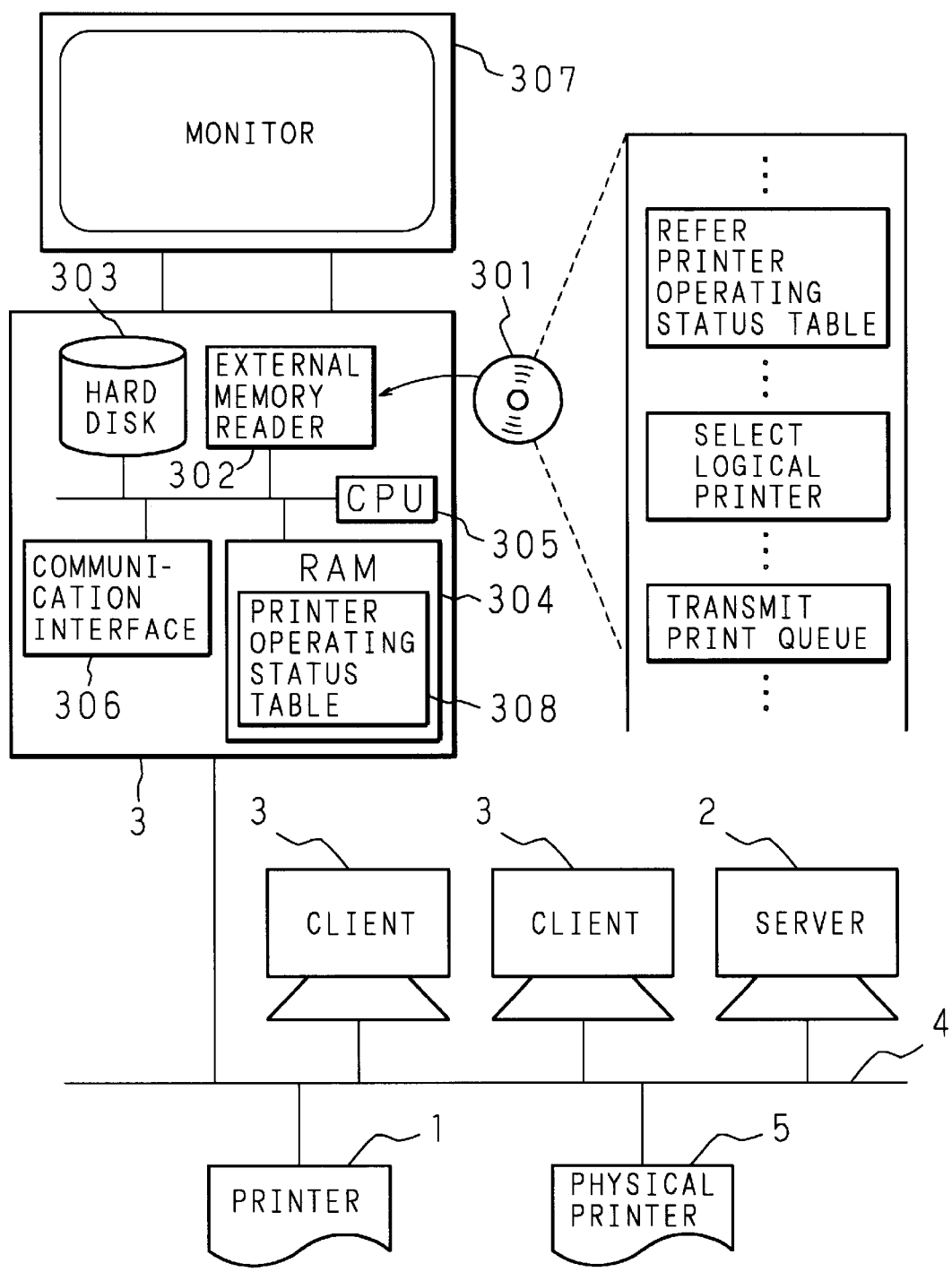
FIG. 19 is a block diagram showing structure of client computers and a network comprising the same according to a third preferred embodiment of the present invention.

FIG. 19 is a block diagram showing structure of clients and a network comprising the same according to the third preferred embodiment of the present invention. In FIG. 19, denoted at 3, 3, . . . are clients. The clients 3, 3, . . . are connected to a network 4. A server 2, a printer 1 and a physical printer 5 are connected to the network 4.

The clients 3 according to the third preferred embodiment are approximately the same in structure as the server 2 according to the second preferred embodiment. The clients 3, 3, . . . each comprise an external memory reader 302, such as a CD-ROM drive, which reads information from a recording medium 301, such as a CD-ROM, in which information such as the programs according to the present invention is recorded. Information read by the external memory readers 302 is stored in hard disks 303 which are built-in within the clients 3.

A CPU 305 reads the information from the hard disk 303, a RAM 304 for temporary storage of information stores the information, and the information is executed on an OS provided in the associated client, whereby the print control method according to the present invention is realized. The clients 3 further each comprises a communication interface 306 which transmits and receives data through the network 4, and a monitor 307 which displays an operating status of the present invention.

Figure 20:
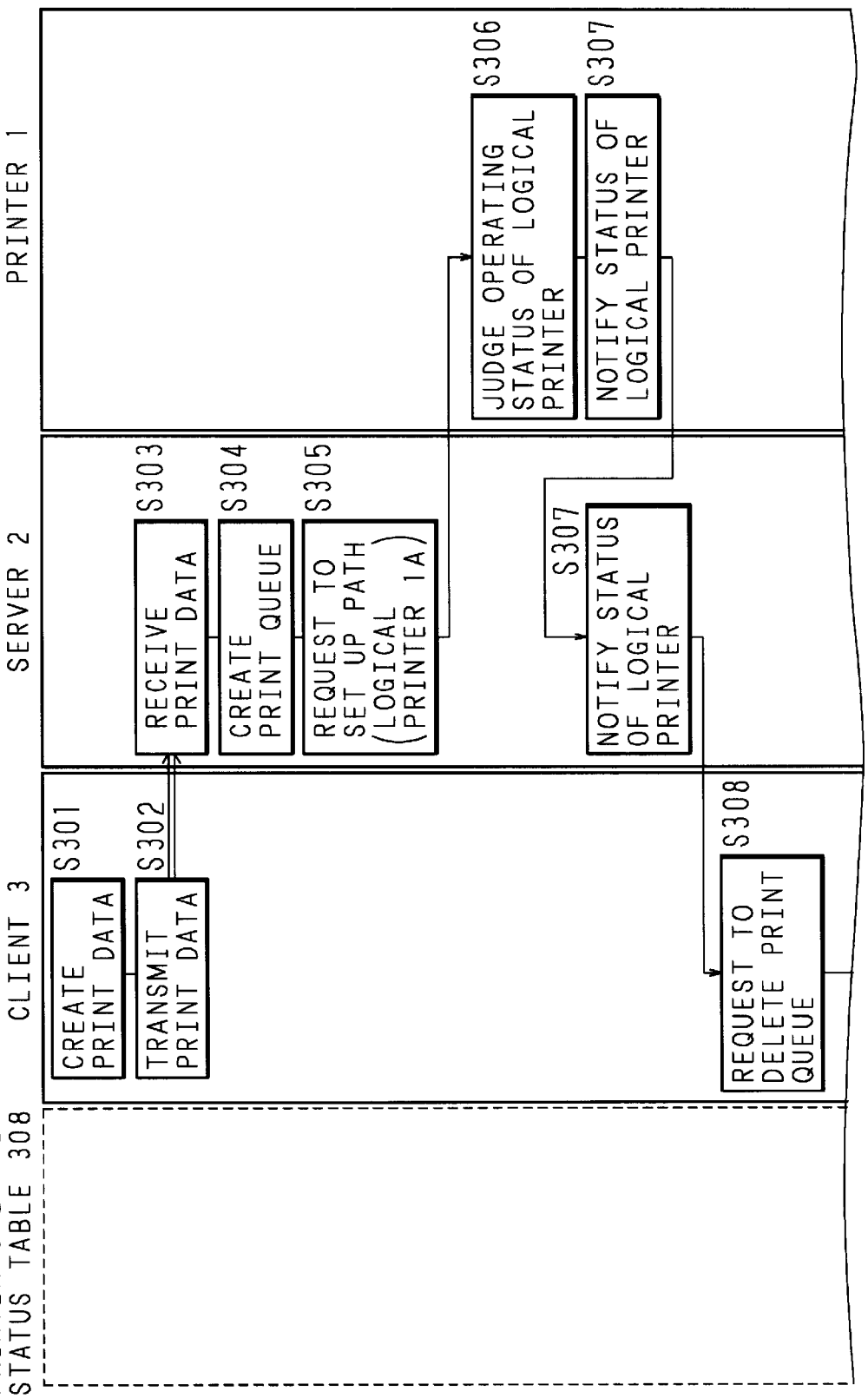
FIG. 20 is a flow chart showing data processing of a server computer, the client computers and a printer in the third preferred embodiment of the present invention.
Figure 21:
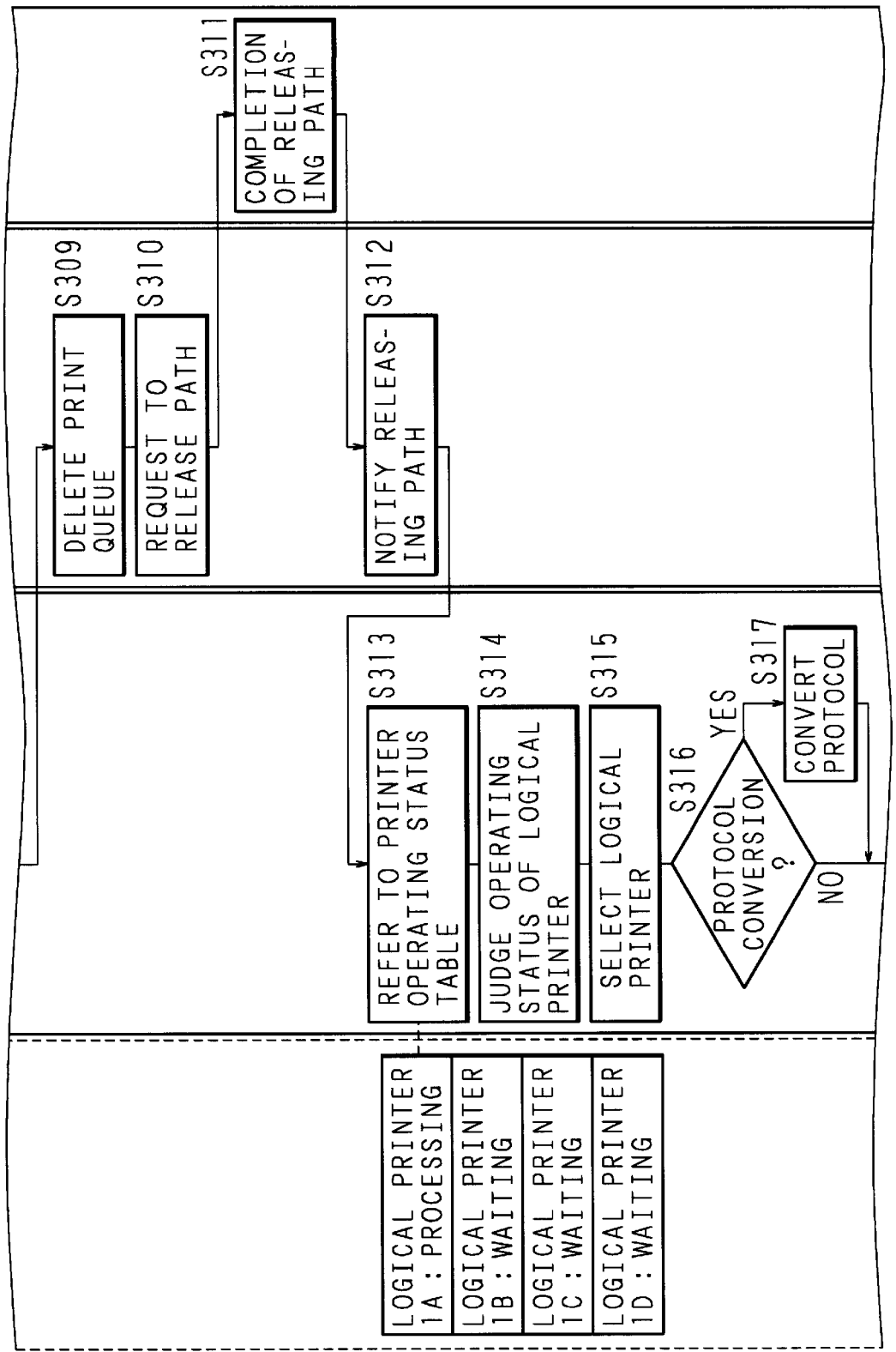
FIG. 21 is a flow chart showing the data processing of the server computer, the client computers and the printer in the third preferred embodiment of the present invention.
Figure 22:
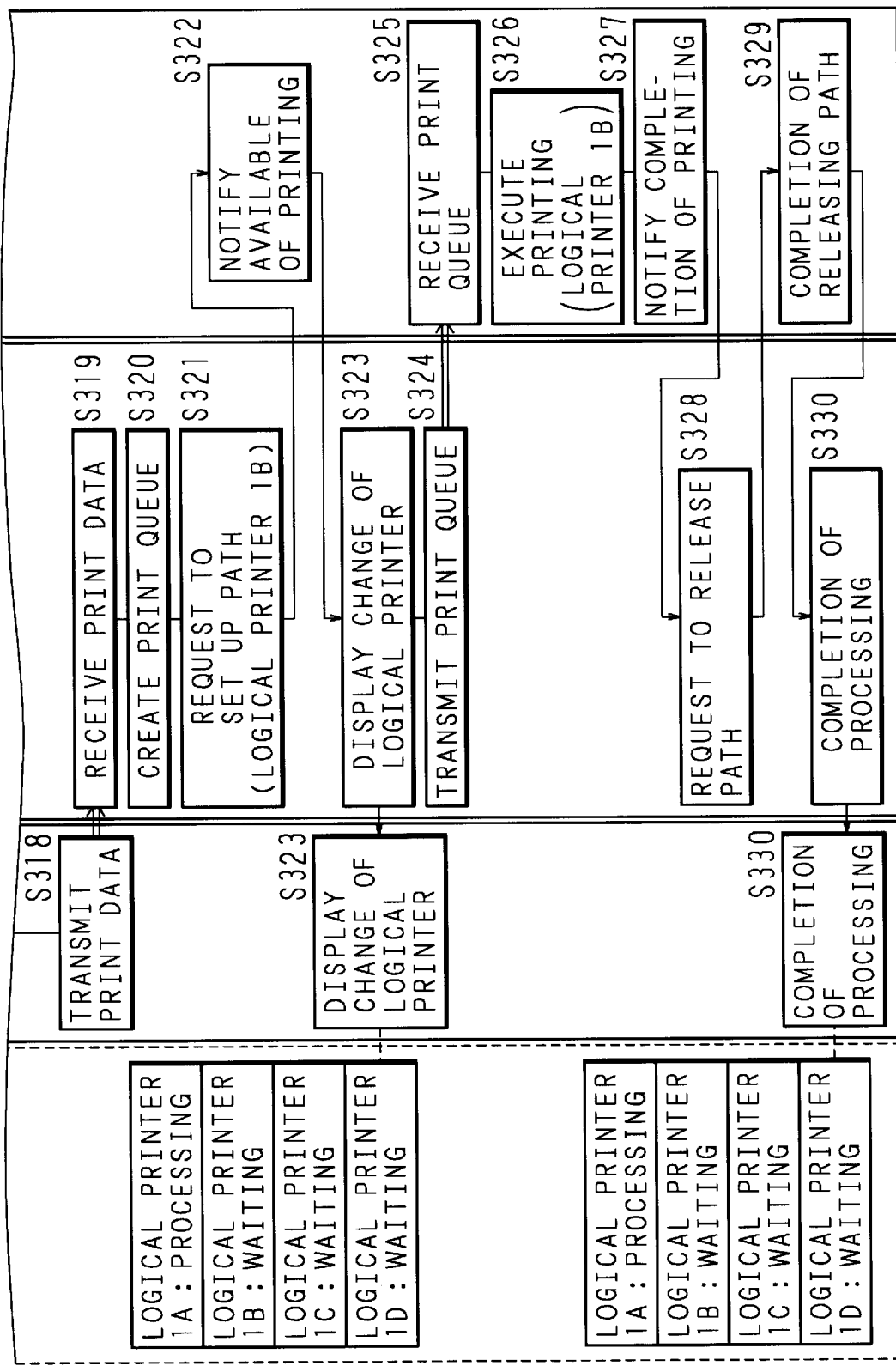
FIG. 22 is a flow chart showing the data processing of the server computer, the client computers and the printer in the third preferred embodiment of the present invention.

FIG. 20, FIG. 21 and FIG. 22 are flow charts showing data processing of the server, the clients and the printers in the third preferred embodiment. The client 3 creates, by FM emulations, print data to be printed by the logical printer 1A (S301), and transmits to the server 2 (S302). The server 2 receives the print data (S303), creates a print queue based on the print data (S304), and requests to set up a path as the print request to the logical printer 1A of the printer 1 (S305).

Requested for printing, the printer 1 judges operating statuses of the logical printers (S306), and notifies the client 3 of the statuses through the server 2 (S307).

In accordance with the notified operating statuses, the client 3 updates the contents of printer operating status table 308 which are set on RAMs 304 of the client 3. The printer 1 refers to the updated printer operating status table 308, and when the logical printer 1A is "unoccupied", requests the server 2 to start printing so that the server 2 transmits a print queue to the logical printer 1A and printing is started. When the logical printer 1A is "processing" in to the reported operating statuses, the client 3 requests the server 2 to delete print queues (S308), the server 2 deletes the print queues (S309), and the server 2 requests the logical printer 1A to release the path (S310).

The printer 1, after the print queue to the logical printer 1A is deleted (S311), notifies the client 3 through the server 2 of the deletion of the print queue (S312).

The client 3 refers to the updated printer operating status table 308 (S313), and when judging that the logical printer 1A is still "processing" and the logical printers 1B through 1D are "unoccupied" (S314), selects the logical printer 1B, which is an FM emulation having the same specifications as the logical printer 1A, as an available logical printer (S315).

Since the print queue received at this stage is formed by print data which postulate printing by the logical printer 1A, even when the logical printer 1A and the logical printer 1B are the same emulations, protocols maybe different. Hence, the client 3 judges the protocols of the logical printers 1A and 1B, and when it is necessary to execute protocol conversion (S316), the protocol is converted (S317).

The client 3 transmits the print data to the server 2 (S318). The server 2 receives the print data (S319), creates a print queue based on the print data (S320), and requests to set up a path to the logical printer 1B of the printer 1 (S321).

Confirming that the logical printer 1B is "unoccupied", the printer 1 notifies the server 2 and the client 3 that the logical printer 1B is available for printing (S322), and monitors (not shown) of the server 2 and/or the client 3 display the change of logical printer, a printer device name, a logical printer number, a discharge stacker type and a discharge stacker number (S323). At this stage, the client 3 updates the operating status of the logical printer 1B to "processing" in the printer operating status table 308.

The server 2 thereafter transmits a print queue to the logical printer 1B of the printer 1 (S324). The logical printer 1B receives the print queue (S325), printing is executed using the logical printer 1B (S326), and after the printing is completed, the logical printer 1B notifies the server 2 of the completion of the printing (S327).

The server 2 requests the logical printer 1B to release the path (S328), and after the path to the logical printer 1B is released (S329), the printer 1 notifies the client 3 through the server 2 of the completion of the processing and the server 2 and the client 3 complete processing (S330). At this stage, the client 3 updates the operating status of the logical printer 1B to "unoccupied" in the printer operating status table 308.

Other essential structure and operations are similar to the essential structure and operations described earlier in relation to the second preferred embodiment, and therefore, will be simply denoted at the same reference numbers without detailed explanation.

(Fourth Preferred Embodiment)

A fourth preferred embodiment relates to a structure which allows a print control apparatus to perform the print control according to the second preferred embodiment, so that it is possible to implement the print control method according to the present invention only by adding the print control apparatus to a conventional printing system.

Figure 23:
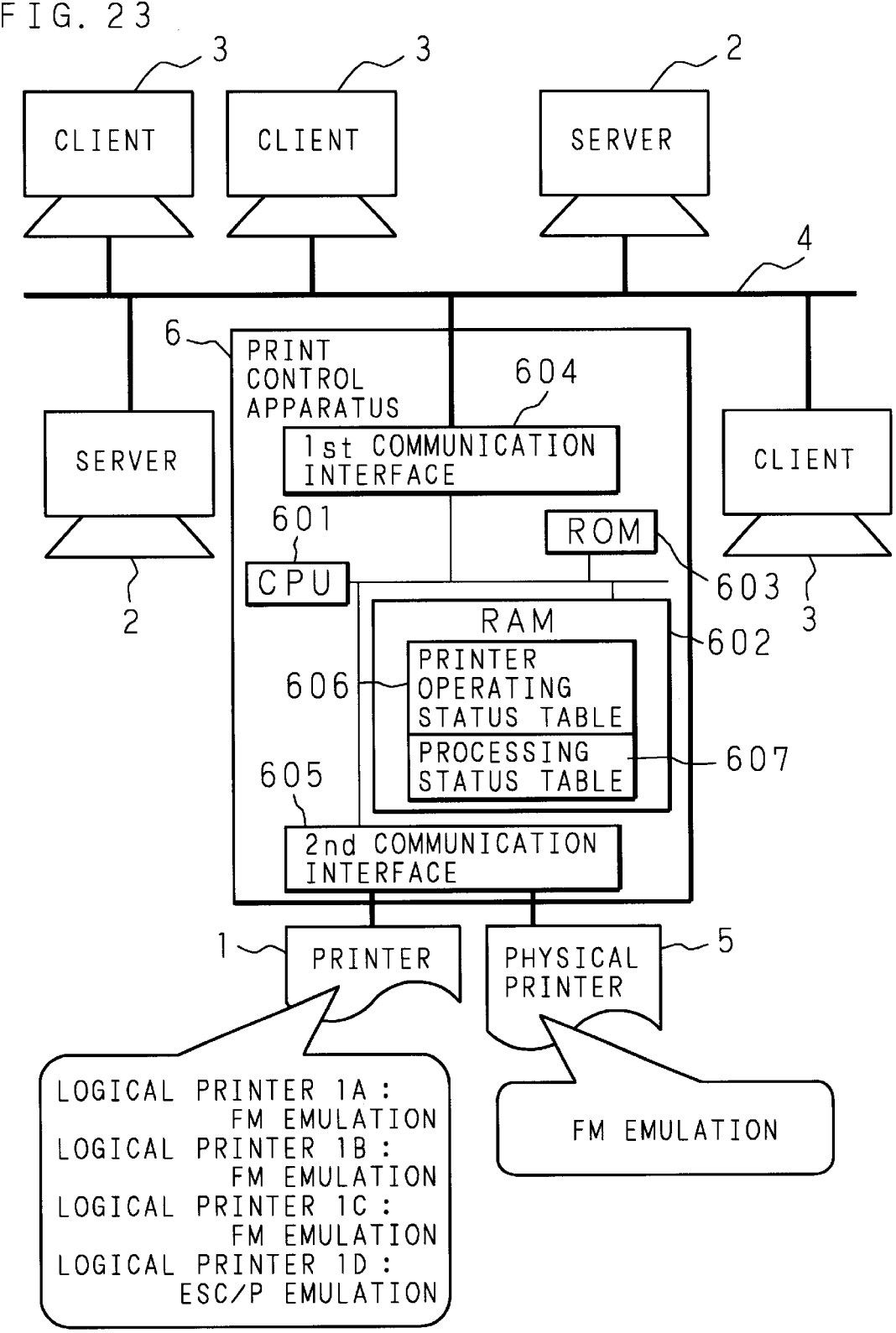
FIG. 23 is a block diagram showing structure of a print control apparatus and a network comprising the same according to a fourth preferred embodiment of the present invention.

FIG. 23 is a block diagram showing a structure of a network comprising a print control apparatus according to the fourth preferred embodiment of the present invention and a structure of the print control apparatus. In FIG. 23, denoted at 6 is the print control apparatus which has a print control function. The print control apparatus 6 is connected to a network 4. Clients 3, 3, . . . , and servers 2, 2, . . . are also connected to the network 4. Further, a printer 1 and a physical printer 5 are connected to the print control apparatus 6.

The print control apparatus 6 comprises a CPU 601. The CPU 601 reads a program from a ROM 603 which stores various types of programs for realizing the print control method according to the present invention, and sets a printer operating status table 606 on a RAM 602 which stores various types of data created upon execution of the programs.

The print control apparatus 6 further comprises a first communication interface 604 for transmitting data to and receiving data from the servers 2, 2, . . . through the network 4, and a second communication interface 605 for transmitting data to and receiving data from the printer 1 and the physical printer 5.

Thus, since the print control function is connected to the network 4 as an independent apparatus in the fourth preferred embodiment, it is possible to process print requests received from the servers 2, 2, . . . .

Figure 24:
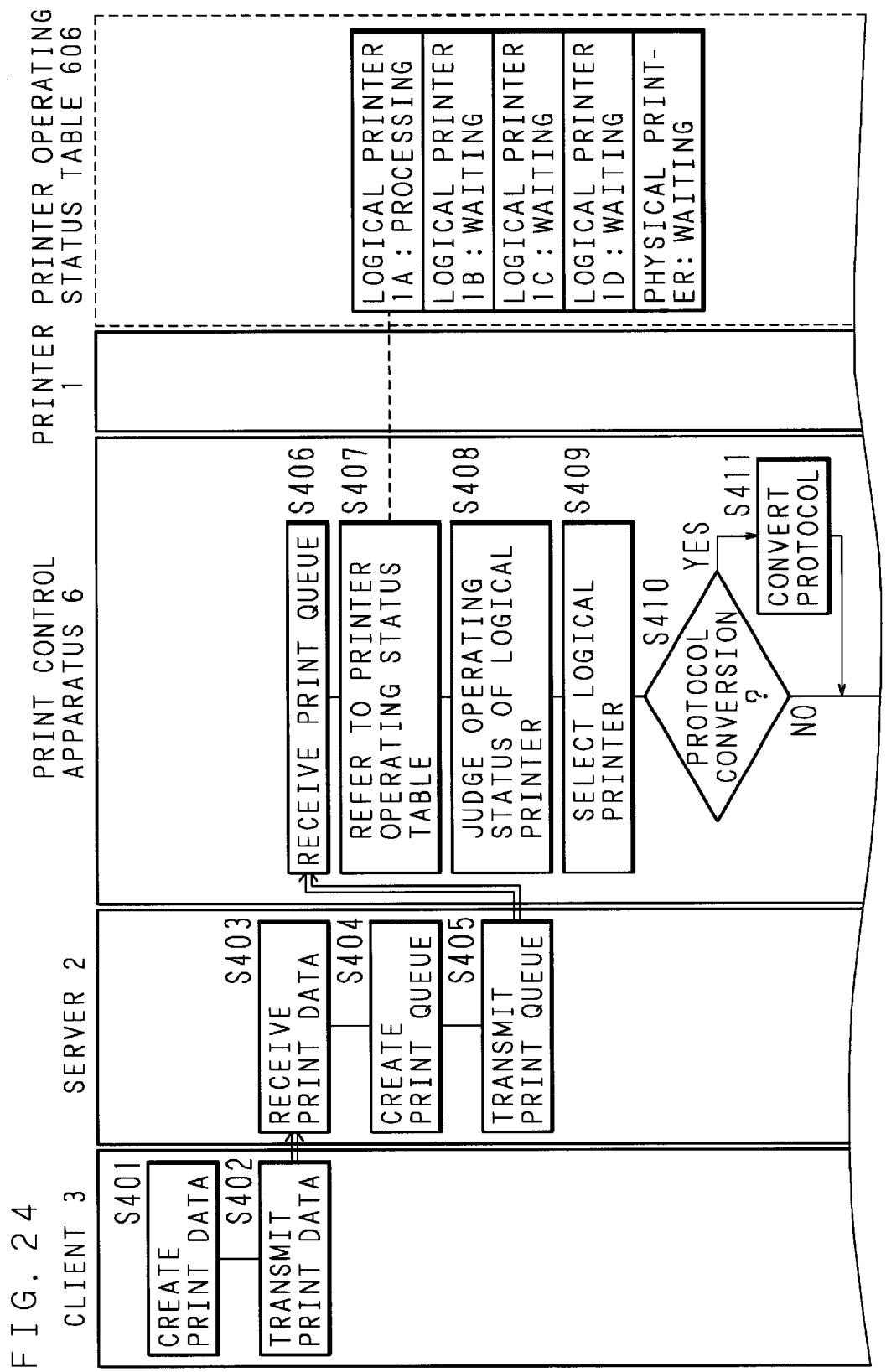
FIG. 24 is a flow chart showing data processing of a server computer, client computers, the print control apparatus and a printer in the fourth preferred embodiment of the present invention.
Figure 25:
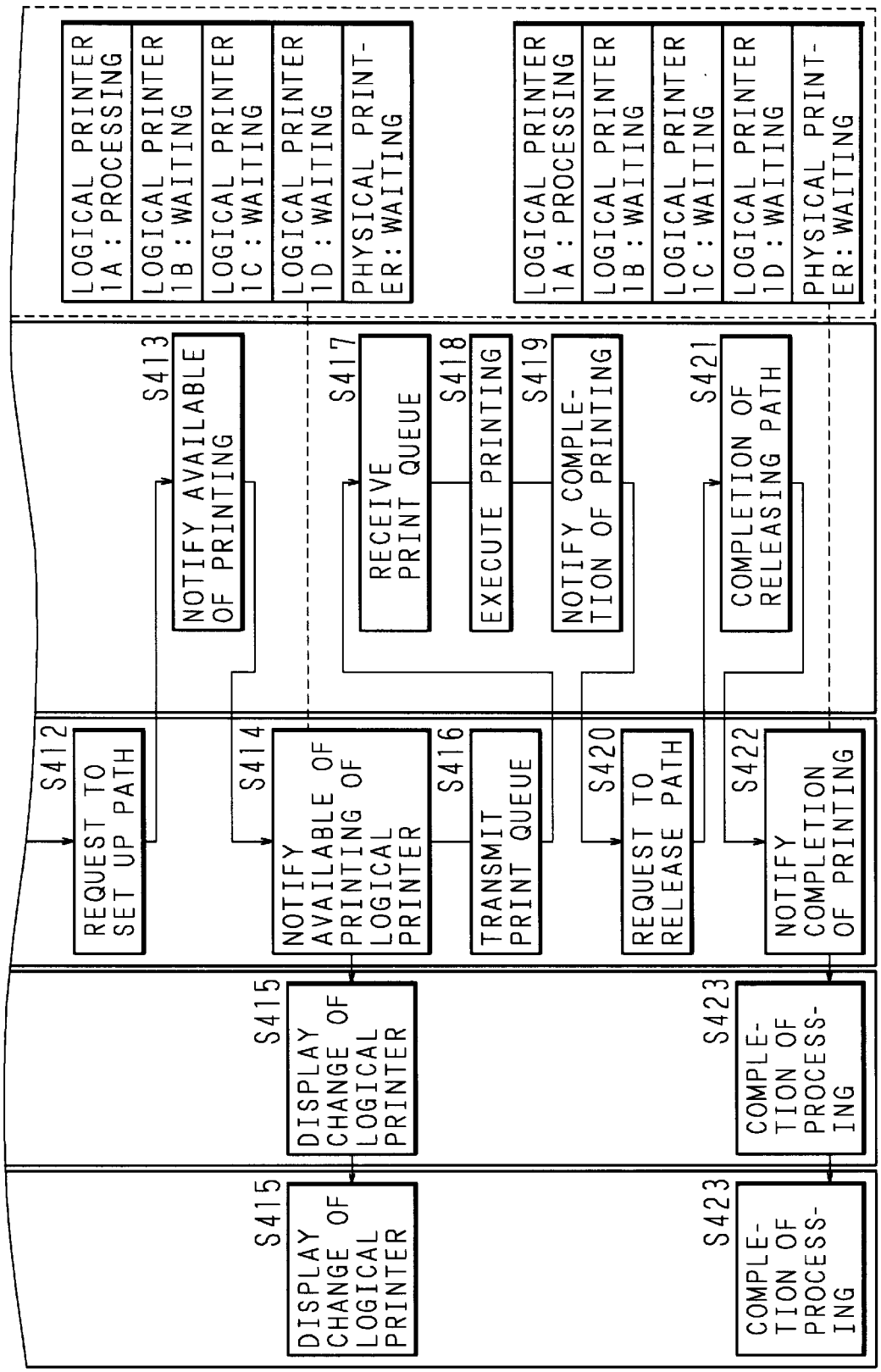
FIG. 25 is a flow chart showing the data processing of the server computer, the client computers, the print control apparatus and the printer in the fourth preferred embodiment of the present invention.

FIG. 24 is a flow chart showing data processing of the servers, the clients, the print control apparatus and the printers in the fourth preferred embodiment. The client 3 creates, by FM emulations, print data to be printed by the logical printer 1A (S401), and transmits to the server 2 (S402). The server 2 receives the print data (S403), creates a print queue based on the print data (S404), and transmits the print queue to the print control apparatus 6 (S405).

The print control apparatus 6 receives the print queue (S406), refers to the printer operating status table 606 set on the RAM provided in the print control apparatus 6 (S407), judges an operating status of the logical printer 1A (S408), and when the logical printer 1A is "unoccupied", sets a path to the logical printer 1A and transmits the print queue so as to start printing.

The print control apparatus 6 judges the operating status of the logical printer 1A, and when the logical printer 1A is "processing" while the logical printers 1B through 1D and the physical printer 5 are "unoccupied", the print control apparatus 6 selects the logical printer 1B, which is an "unoccupied" and FM emulation having the same specifications as the logical printer 1A, as an available logical printer (S409).

Note that, since the print data created by the client 3 are print data which postulate printing by the logical printer 1A, even when the logical printer 1A and the logical printer 1B are the same emulations, protocols may be different. Hence, after selecting among the logical printers, the print control apparatus 6 judges the protocols of the logical printers 1A and 1B, and when it is necessary to execute protocol conversion (S410), the protocol is converted (S411).

The print control apparatus 6 thereafter requests the logical printer 1B to set up a path (S412). Confirming that the logical printer 1B is "unoccupied", the printer 1 notifies the print control apparatus 6 that the logical printer 1B is available for printing (S413). The print control apparatus 6 notifies the servers 2 and the client 3 that the logical printer 1B is available for printing (S414), and updates the operating status of the printer 2 to "processing" in the printer operating status table 606. Monitors (not shown) of the servers 2 and/or the client 3 display the change of logical printer, a printer device name, a logical printer number, a discharge stacker type and a discharge stacker number (S415).

The print control apparatus 6 thereafter transmits a print queue to the logical printer 1B of the printer 1 (S416). The logical printer 1B receives the print queue (S417), printing is executed using the logical printer 1B (S418), and after the printing is completed, the logical printer 1B notifies the print control apparatus 6 of the completion of the printing (S419).

The print control apparatus 6 requests the logical printer 1B to release the path (S420), and after the path to the logical printer 1B is released (S421), the printer 1 notifies the print control apparatus 6 of the completion of the processing.

The print control apparatus 6 then updates the operating status of the logical printer 1B to "unoccupied" in the printer operating status table 606, notifies the servers 2 and the client 3 of the completion of the processing (S422), so that the servers 2 and the client 3 complete processing (S423).

In addition, the print control apparatus 6 according to the fourth preferred embodiment, using a processing status table 607 (See FIG. 23.) which shows processing loads upon the respective printers and which is set up on the RAM 602 as in the case of the server 2 according to the second preferred embodiment, monitors the total of the processing loads upon the respective printers. It is therefore possible to perform load distribution control processing of which print loads are distributed over both the printer 1 and the physical printer 5.

Figure 26:
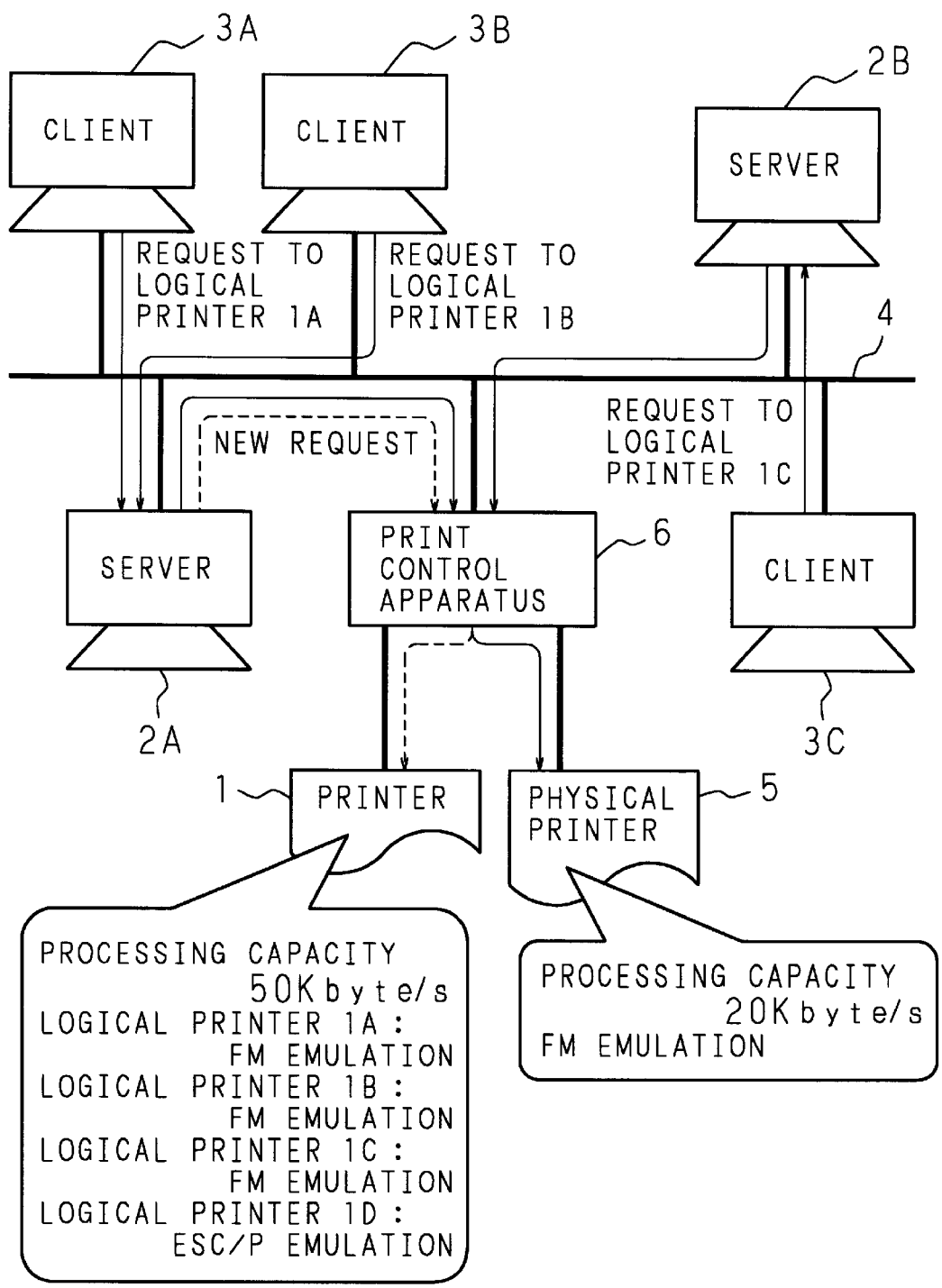
FIG. 26 is an explanatory diagram for describing an example of load distribution control processing of the fourth preferred embodiment of the present invention.

The load distribution control processing according to the fourth preferred embodiment will be described with reference to an explanatory diagram which shows an example of load distribution control processing of FIG. 26. In FIG. 26, the clients are denoted at 3A, 3B, 3C, . . . , and the servers are denoted at 2A, 2B, . . . , so as to distinguish the plurality of clients and servers from each other.

In a case that there is a print request from the client 3A through the server 2A to the logical printer 1A with a processing load of 20 Kbyte/s and there is a print request from the client 3B through the server 2A to the logical printer 1B with a processing load of 25 Kbyte/s in a printer 1 whose capacity as other communication settings is 50 Kbyte/s, if the client 3C issues a print request to the logical printer 1C through the server 2B with a processing load of 15 Kbyte/s, in order to ensure that the processing load upon the printer 1 does not exceed the processing capacity, a print queue is transmitted to the physical printer 5 which is the same emulation as the logical printer 1C and can accept a print request, so that printing is executed.

Other essential structure and operations are similar to the essential structure and operations described earlier in relation to the second preferred embodiment, and therefore, will be simply denoted at the same reference numbers without detailed explanation.

Industrial Applicability

As described in detail above, according to the present invention, a print request created by a data transmitting apparatus is transmitted designating a physical or logical printer which is to be used for printing, and when the designated printer is in the process of printing, the print request is automatically switched to other printer than the designated printer.

Further, at the time of the print request to the designated printer, if a processing capability of the printer is surpassed, a printer except for the designated printer which can accept the print request is retrieved, and the print request is automatically switched to the retrieved printer.

Thus, since the print request is switched automatically to an unoccupied printer even when the designated printer to which the print request is directed is printing, it is possible to reduce an uneconomical time waiting for printing and omit a job of requesting for printing once again.

Moreover, since concentration of print requests upon one printer is prevented, an excellent effect is obtained that it is possible to prevent a print speed of the printer and an overall throughput from decreasing.

What is claimed is:

1. A printer comprising a plurality of virtual printing means, which share a physical portion and operate independently of each other for parallelly processing a plurality pieces of print data supplied from outside, and processing print data by one of a plurality of virtual printing means corresponding to a communication setting which is used when said print data is supplied, comprising:

judging means for judging whether one of the plurality of virtual printing means corresponding to communication setting of supplied print data, is operating or not; and controlling means for, when said judging means judges that said one of the plurality of virtual printing means is operating, controlling any one of the remaining printing means which is not operating to process said print data.

2. A printer as set forth in claim 1, wherein said controlling means comprises:

means for judging communication setting of said supplied print data; and means for, when it is judged that said communication setting does not correspond to the one of the plurality of virtual printing means for processing said print data, converting said communication setting into communication setting corresponding to said one of the plurality of virtual printing means.

3. A data processing apparatus for transmitting print data supplied from outside to physical printing means or any one of a plurality of virtual printing means set in physical printing means which share a physical portion and operate independently of each other for parallelly processing a plurality of pieces of print data, comprising:

a table which shows whether said physical and said plurality of virtual printing means are operating or not;

means for judging whether said physical and said plurality of virtual printing means are operating or not based on said table; and means for, when it is judged that physical or said plurality of virtual printing means designated as a first transmission destination is operating, selecting other of said physical or said plurality of virtual printing means which is not operating as a second transmission destination.

4. A data processing apparatus as set forth in claim 3, further comprising:

means for judging communication settings used for transmitting print data to printing means of said first and second transmission destinations; and means for, when it is judged that communication settings corresponding to printing means as said first and second transmission destinations are different from each other, converting a communication setting corresponding to said first transmission destination into a communication setting corresponding to said second transmission destination.

5. A data transmitting apparatus for transmitting print data to physical printing means or any one of a plurality of virtual printing means set in physical printing means which share a physical portion and operate independently of each other for parallelly processing a plurality of pieces of print data, comprising:

a table which shows whether said physical and said plurality of virtual printing means are operating or not;

means for judging whether said physical and said plurality of virtual printing means are operating or not based on said table;

means for, when it is judged that said physical or said plurality of virtual printing means designated as a first transmission destination is operating, deleting said print data transmitted to said first transmission destination; and means for transmitting said print data to other of said physical or said plurality of virtual printing means which is not operating as a second transmission destination.

6. A data transmitting apparatus as set forth in claim 5, further comprising:

means for judging communication settings used for transmitting print data to printing means of said first and second transmission destinations; and means for, when it is judged that communication settings corresponding to said first and second transmission destinations are different from each other, converting a communication setting corresponding to said first transmission destination into a communication setting corresponding to said second transmission destination.

7. A print control apparatus for transmitting print data supplied from outside to physical printing means or any one of a plurality of virtual printing means set in physical printing means which share a physical portion and operate independently of each other for parallelly processing a plurality of pieces of print data, comprising:

means for receiving print data through a data processing apparatus transmitted from a data transmitting apparatus which transmits print data using communication settings set separately for respective physical or said plurality of virtual printing means;

a table which shows whether said physical and said plurality of virtual printing means are operating or not and/or information relating to print processing capabilities of said physical and said plurality of virtual printing means;

means for judging whether said physical or said plurality of virtual printing means are available for printing or not based on said table; and means for, when it is judged that physical or said plurality of virtual printing means designated as a first transmission destination of said print data is not available for printing, selecting other of said physical or said plurality of virtual printing means which is available for printing as a second transmission destination.

8. A print control apparatus as set forth in claim 7, further comprising:

means for judging communication settings used for transmitting print data to printing means of said first and second transmission destinations; and means for, when it is judged that communication settings corresponding to said first and second transmission destinations are different from each other, converting a communication setting corresponding to said first transmission destination into a communication setting corresponding to said second transmission destination.

9. A printing system, comprising:

a data transmitting apparatus transmitting print data;

a data processing apparatus receiving print data transmitted from said data transmitting apparatus and transmitting received print data; and a printer as set forth in claim 1, which receives print data transmitted from said data processing apparatus and processes received print data, or both of said printer and physical printing means processing the received print data.

10. A printing system, comprising:

a data transmitting apparatus transmitting print data;

a data processing apparatus as set forth in claim 3, which receives print data transmitted from said data transmitting apparatus and transmits received print data; and a printer which comprises a plurality of virtual printing means sharing a physical portion operating independently of each other for parallelly processing a plurality of pieces of print data, receiving print data transmitted from said data processing apparatus, and printing the received print data, or both of said printer and physical printing means printing the received print data.

11. A printing system, comprising:

a data transmitting apparatus as set forth in claim 5, for transmitting print data;

a data processing apparatus receiving print data transmitted from said data transmitting apparatus and transmitting received print data; and a printer which comprises a plurality of virtual printing means sharing a physical portion operating independently of each other for parallelly of processing a plurality of pieces of print data, receiving print data transmitted from said data processing apparatus, and printing received print data, or both of said printer and physical printing means printing the received print data.

12. A printing system, comprising:

a data transmitting apparatus transmitting print data;

a data processing apparatus receiving print data transmitted from said data transmitting apparatus and transmitting received print data;

a print control apparatus as set forth in claim 7, for receiving print data transmitted from said data processing apparatus and transmitting received print data; and a printer which comprises a plurality of virtual printing means sharing a physical portion operating independently of each other for parallelly processing a plurality of pieces of print data, receiving print data transmitted from said print control apparatus, and printing received print data or both of said printer and physical printing means printing the received print data.

13. A computer readable recording medium storing a program for causing a computer to transmit print data to physical printing means or a plurality of virtual printing means set in physical printing means which share a physical portion and operate independently of each other for parallelly processing a plurality of pieces of print data, comprising:

first program code means for causing a computer to set up a table which shows whether said physical and said plurality of virtual printing means are operating or not and/or information relating to print processing capabilities of said physical and said plurality of virtual printing means;

second program code means for causing said computer to judge, based on said table set up by said computer, whether said physical and said plurality of virtual printing means are available for printing;

third program code means for causing said computer, when it is judged that physical or said plurality of virtual printing means designated as a first transmission destination is not available for printing, to transmit print data to other of said physical or said plurality of virtual printing means which is available for printing as a second transmission destination.

14. A recording medium as set forth in claim 13, wherein said third program code means comprises:

program code means for causing said computer to judge communication settings used for transmitting print data to printing means of said first and said second transmission destinations; and program code means for causing said computer, when it is judged that said communication settings corresponding to said first and said second transmission destinations are different from each other, to convert a communication setting corresponding to said first transmission destination into a communication setting corresponding to said second transmission destination.

15. A computer readable recording medium storing a program for causing a computer to transmit print data to physical printing means or a plurality of virtual printing means set in physical printing means which share a physical portion and operate independently of each other for parallelly processing a plurality of pieces of print data, comprising:

first program code means for causing a computer to transmit print data by communication settings set separately for respective physical or said plurality of virtual printing means, so that any one of said physical or said plurality of virtual printing means performs printing;

second program code means for causing a computer to set up a table which shows whether said physical or said plurality of virtual printing means are operating or not and/or information relating to print processing capabilities of said physical or said plurality of virtual printing means;

third program code means for causing said computer to judge, based on said table set up by said computer, whether said printing means are available for printing;

fourth program code means for causing said computer, when it is judged that the physical or said plurality of virtual printing means designated as a first transmission destination is not available for printing, to delete said print data transmitted to said first transmission destination; and fifth program code means for causing said computer to transmit said print data to other of said physical or said plurality of virtual printing means which is available for printing as a second transmission destination.

16. A recording medium as set forth in claim 15, wherein said fifth program code means comprises:

program code means for causing said computer to judge communication settings used for transmitting print data to printing means of said first and said second transmission destinations; and program code means for causing said computer, when it is judged that said communication settings corresponding to said first and said second transmission destinations are different from each other, to convert a communication setting corresponding to said first transmission destination into a communication setting corresponding to said second transmission destination.

17. A print control method for printing by transmitting print data to physical printing means or a plurality of virtual printing means set in physical printing means which share a physical portion and operate independently of each other for parallelly processing a plurality of pieces of print data, comprising:

referring to a table which shows whether said physical and said plurality of virtual printing means are operating or not and/or information relating to print processing capabilities of said physical and said plurality of virtual printing means;

judging whether said physical and said plurality of virtual printing means are available for printing or not based on said table;

when it is judged that one of said physical or said plurality of virtual printing means designated as a first transmission destination of print data is not available for printing, selecting other of said physical and said plurality of virtual printing means available for printing as a second transmission destination; and transmitting said print data to said physical or said plurality of virtual printing means selected as said second transmission destination.

18. A print control method as set forth in claim 17, wherein said transmitting further comprises:

judging communication settings used for transmitting print data to printing means of said first and said second transmission destinations;

when it is judged that communication settings corresponding to said first and said second transmission destinations are different from each other, converting a communication setting corresponding to said first transmission destination into a communication setting corresponding to said second transmission destination; and transmitting said print data to printing means of said second transmission destination using the converted communication setting.

19. A printer comprising:

a single physical printer including a plurality of virtual printers which share a physical portion and operate independently of each other for processing in parallel a plurality of pieces of print data supplied externally;

a judging unit judging whether one of said plurality of virtual printers is operating or not when the print data is supplied; and a controller controlling any one of the remaining virtual printers which is not operating, to process the supplied print data when said judging unit determines that the virtual printer is judged to be operating.

* * * * *

UNITED STATES PATENT AND TRADEMARK OFFICE
CERTIFICATE OF CORRECTION

PATENT NO. : 6,804,022 B2
DATED : October 1, 2004
INVENTOR(S) : Takaji Fujiwara et al.

It is certified that error appears in the above-identified patent and that said Letters Patent is hereby corrected as shown below:

Title page,
Item [56], References Cited, FOREIGN PATENT DOCUMENTS, add the following omitted references:
-- JP   08-36472    2/1996
   JP   62-184528  8/1987
   JP   4-250522   9/1992
   JP   6-149500   5/1994
   JP   6-183109   7/1994 --

Signed and Sealed this

Thirty-first Day of May, 2005

JON W. DUDAS
*Director of the United States Patent and Trademark Office*